US007470190B2

(12) United States Patent
Baerlocher et al.

(10) Patent No.: US 7,470,190 B2
(45) **Date of Patent: *Dec. 30, 2008**

(54) GAMING DEVICE HAVING TERMINATION VARIABLES

(75) Inventors: Anthony J. Baerlocher, Reno, NV (US); Dennis K. Mead, Reno, NV (US); Bayard S. Webb, Sparks, NV (US); John G. Gilliland, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/830,237

(22) Filed: Jul. 30, 2007

(65) Prior Publication Data

US 2008/0076516 A1 Mar. 27, 2008

Related U.S. Application Data

(63) Continuation of application No. 10/982,476, filed on Nov. 5, 2004, which is a continuation of application No. 10/429,001, filed on May 2, 2003, now Pat. No. 6,814,664, which is a continuation of application No. 09/966,658, filed on Sep. 28, 2001, now Pat. No. 6,607,438.

(51) Int. Cl.
*A63F 9/24* (2006.01)
*A63F 13/00* (2006.01)
*G06F 17/00* (2006.01)
*G06F 19/00* (2006.01)

(52) U.S. Cl. ..................... 463/25; 273/138 R; 273/142; 273/144; 345/418; 345/433

(58) Field of Classification Search ................... 463/16, 463/25
See application file for complete search history.

(56) References Cited

U.S. PATENT DOCUMENTS 4,695,053 A 9/1987 Vazquez, Jr. et al.
5,205,555 A 4/1993 Hamano (Continued)

FOREIGN PATENT DOCUMENTS

EP 0945837 A2 9/1999

(Continued)

OTHER PUBLICATIONS

Bingo Brochure written by Casino Data Systems, published in 1998.

(Continued)

*Primary Examiner*—Robert E Pezzuto
*Assistant Examiner*—Paul A. D'Agostino
(74) *Attorney, Agent, or Firm*—Bell, Boyd & Lloyd LLP

(57) ABSTRACT

A gaming device that enables players to accumulate awards until there are no more awards or until one or more termination variables reaches a predetermined limit is provided. A random generation device generates awards upon a player input. One or more termination variables is used, each defined by or divisible into a plurality of units, wherein a random generation device generates an amount of units upon a player input. A game termination limit of accumulated or lost termination units is provided, wherein a player generates awards until accumulating the termination limit of units.

18 Claims, 31 Drawing Sheets

U.S. PATENT DOCUMENTS

| | | | | |
|---|---|---|---|---|
| 5,324,041 | A | 6/1994 | Boylan et al. | |
| 5,342,047 | A | 8/1994 | Heidel et al. | |
| 5,536,016 | A | 7/1996 | Thompson | |
| 5,769,716 | A | 6/1998 | Saffari et al. | |
| 5,788,573 | A | 8/1998 | Baerlocher et al. | |
| 5,833,536 | A | 11/1998 | Davids et al. | |
| 5,851,148 | A | 12/1998 | Brune et al. | |
| 5,855,514 | A | 1/1999 | Kamille | |
| 5,873,781 | A | 2/1999 | Keane | |
| 5,947,819 | A * | 9/1999 | Ohshima | 463/2 |
| 5,947,820 | A | 9/1999 | Morro et al. | |
| 5,964,463 | A | 10/1999 | Moore, Jr. | |
| 5,980,384 | A | 11/1999 | Barrie | |
| 5,984,781 | A | 11/1999 | Sunaga | |
| 5,997,400 | A | 12/1999 | Seelig et al. | |
| 6,004,207 | A | 12/1999 | Wilson, Jr. et al. | |
| 6,007,426 | A * | 12/1999 | Kelly et al. | 463/16 |
| 6,015,346 | A | 1/2000 | Bennett | |
| 6,033,307 | A | 3/2000 | Vancura | |
| 6,059,289 | A | 5/2000 | Vancura | |
| 6,089,976 | A | 7/2000 | Schneider et al. | |
| 6,102,798 | A | 8/2000 | Bennett | |
| 6,110,043 | A * | 8/2000 | Olsen | 463/27 |
| 6,117,009 | A | 9/2000 | Yoseloff | |
| 6,120,031 | A | 9/2000 | Adams | |
| 6,126,542 | A | 10/2000 | Fier | |
| 6,126,547 | A | 10/2000 | Ishimoto | |
| 6,135,885 | A | 10/2000 | Lermusiaux | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,120 | A * | 12/2000 | Takahashi et al. | 463/8 |
| 6,162,121 | A | 12/2000 | Morro et al. | |
| 6,164,652 | A | 12/2000 | Lauretta et al. | |
| 6,165,070 | A * | 12/2000 | Nolte et al. | 463/20 |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,190,255 | B1 * | 2/2001 | Thomas et al. | 463/20 |
| 6,203,429 | B1 | 3/2001 | DeMar et al. | |
| 6,231,445 | B1 | 5/2001 | Acres | |
| 6,244,956 | B1 * | 6/2001 | Nakayama et al. | 463/3 |
| 6,261,177 | B1 | 7/2001 | Bennett | |
| 6,270,409 | B1 | 8/2001 | Shuster | |
| 6,270,416 | B1 * | 8/2001 | Komoto | 463/43 |
| 6,299,165 | B1 | 10/2001 | Nagano | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,319,121 | B1 * | 11/2001 | Yamada et al. | 463/8 |
| 6,322,309 | B1 * | 11/2001 | Thomas et al. | 413/20 |
| 6,328,649 | B1 | 12/2001 | Randall et al. | |
| 6,346,043 | B1 | 2/2002 | Colin et al. | |
| 6,398,218 | B1 | 6/2002 | Vancura | |
| 6,406,369 | B1 | 6/2002 | Baerlocher et al. | |
| 6,413,160 | B1 | 7/2002 | Vancura | |
| 6,425,827 | B1 * | 7/2002 | Nimura | 463/35 |
| 6,435,511 | B1 | 8/2002 | Vancura et al. | |
| 6,494,783 | B2 * | 12/2002 | Namba et al. | 463/3 |
| 6,494,785 | B1 | 12/2002 | Gerrard et al. | |
| 6,506,118 | B1 | 1/2003 | Baerlocher et al. | |
| 6,511,375 | B1 | 1/2003 | Kaminkow | |
| 6,514,141 | B1 | 2/2003 | Kaminkow et al. | |
| 6,582,306 | B1 | 6/2003 | Kaminkow | |
| 6,599,185 | B1 | 7/2003 | Kaminkow et al. | |
| 6,599,193 | B2 | 7/2003 | Baerlocher et al. | |
| 6,602,136 | B1 | 8/2003 | Baerlocher et al. | |
| 6,620,045 | B2 | 9/2003 | Berman et al. | |
| 6,634,943 | B1 | 10/2003 | Baerlocher | |
| 6,638,164 | B2 | 10/2003 | Randall et al. | |
| 6,659,864 | B2 | 12/2003 | McGahn et al. | |
| 6,663,489 | B2 | 12/2003 | Baerlocher | |
| 6,682,073 | B2 | 1/2004 | Bryant et al. | |
| 6,688,975 | B2 | 2/2004 | Baerlocher et al. | |
| 6,722,981 | B2 | 4/2004 | Kaminkow et al. | |
| 6,722,982 | B2 | 4/2004 | Kaminkow et al. | |
| 6,726,563 | B1 | 4/2004 | Baerlocher et al. | |
| 6,731,313 | B1 | 5/2004 | Kaminkow | |
| 6,758,747 | B2 | 7/2004 | Baerlocher | |
| 6,767,283 | B1 | 7/2004 | Weiss | |
| 6,776,711 | B1 | 8/2004 | Baerlocher | |
| 6,780,110 | B2 | 8/2004 | Baerlocher et al. | |
| 6,786,820 | B2 | 9/2004 | Gerrard et al. | |
| 6,793,579 | B2 | 9/2004 | Baerlocher et al. | |
| 6,796,899 | B2 | 9/2004 | Baerlocher | |
| 6,796,900 | B2 | 9/2004 | Baerlocher et al. | |
| 6,796,905 | B2 | 9/2004 | Baerlocher et al. | |
| 6,951,516 | B1 * | 10/2005 | Eguchi et al. | 463/40 |
| 7,033,272 | B1 * | 4/2006 | Mason | 463/25 |
| 2002/0077176 | A1 * | 6/2002 | Yamaki | 463/31 |
| 2002/0132660 | A1 * | 9/2002 | Taylor | 463/16 |
| 2002/0142822 | A1 | 10/2002 | Baerlocher et al. | |
| 2002/0142823 | A1 | 10/2002 | DeMar et al. | |
| 2002/0151341 | A1 | 10/2002 | Baerlocher et al. | |
| 2002/0151357 | A1 | 10/2002 | Acres | |
| 2002/0155873 | A1 | 10/2002 | Berman et al. | |
| 2002/0155883 | A1 | 10/2002 | Baerlocher | |
| 2002/0165019 | A1 | 11/2002 | Slomiany | |
| 2003/0100361 | A1 * | 5/2003 | Sharpless et al. | 463/25 |
| 2004/0072607 | A1 * | 4/2004 | Thomas et al. | 463/16 |
| 2004/0102238 | A1 * | 5/2004 | Taylor | 463/16 |
| 2006/0160592 | A1 * | 7/2006 | Endo et al. | 463/8 |
| 2007/0072673 | A1 * | 3/2007 | Bennett et al. | 463/25 |

FOREIGN PATENT DOCUMENTS

| | | |
|---|---|---|
| EP | 0984407 A2 | 8/2000 |
| GB | 2 353 128 | 2/2001 |
| WO | PCT/AU97/00121 | 9/1997 |
| WO | WO 01/19476 | 3/2001 |

OTHER PUBLICATIONS

Bonus Spin Red, White & Blue Advertisement written by IGT, published date unknown.

Full House Brochure written by Anchor Games, published in 2000.

Jewel in the Crown Advertisement written by IGT, published in 2000.

Red Hot 7's Game Description written by IGT, game available prior to 2001.

Slot Line Advertisement including Temperature Rising game description written by IGT, published in 1998.

Top Dollar Brochure written by IGT, published in 1998.

* cited by examiner

FIG.6A

118

120

| AWARD |
|---|
| 2 |
| 3 |
| 4 |
| 5 |
| 8 |
| 10 |
| 15 |
| 20 |
| 25 |
| 30 |
| 35 |
| 50 |
| 70 |
| 95 |
| 120 |
| 150 |

FIG.6B

122

120

124

| AWARD | LIKELIHOOD |
|---|---|
| 2 | 5% |
| 3 | 5% |
| 4 | 5% |
| 5 | 5% |
| 8 | 5% |
| 10 | 5% |
| 15 | 10% |
| 20 | 10% |
| 25 | 10% |
| 30 | 10% |
| 35 | 5% |
| 50 | 5% |
| 70 | 5% |
| 95 | 5% |
| 120 | 5% |
| 150 | 5% |

FIG.7A

126

130 132

| VARIABLE 1 | |
|---|---|
| TERMINATION UNITS | SURVIVAL UNITS |
| 1 | 0 |
| 2 | 0 |
| 3 | 1 |
| 5 | 2 |
| 8 | 3 |
| 10 | 5 |

FIG.7B

128

130 132

| VARIABLE 2 | |
|---|---|
| TERMINATION UNITS | SURVIVAL UNITS |
| 5 | 0 |
| 10 | 1 |
| 15 | 5 |
| 20 | 10 |
| 30 | 15 |
| 50 | 25 |

FIG.7C

134

| VARIABLE 1 | | | |
|---|---|---|---|
| TERM UNITS | LIKELI-HOOD % | SURVIVAL UNITS | LIKELI-HOOD % |
| 1 | 20% | 0 | 20% |
| 2 | 20% | 0 | 20% |
| 3 | 20% | 1 | 20% |
| 5 | 20% | 2 | 20% |
| 8 | 10% | 3 | 10% |
| 10 | 10% | 5 | 10% |

130 124 132 124

FIG.7D

136

| VARIABLE 2 | | | |
|---|---|---|---|
| TERM UNITS | LIKELI-HOOD % | SURVIVAL UNITS | LIKELI-HOOD % |
| 5 | 20% | 0 | 20% |
| 10 | 20% | 1 | 20% |
| 15 | 20% | 2 | 20% |
| 20 | 20% | 5 | 20% |
| 30 | 10% | 8 | 10% |
| 50 | 10% | 10 | 10% |

130 124 132 124

FIG. 7E

138

| | PICK #1 | | | | PICK #2 | | | | PICK #3 | | | | PICK #4 | | | |
|---|---|---|---|---|---|---|---|---|---|---|---|---|---|---|---|---|
| | TERM | % | SURVIVAL | % | TERM | % | SURVIVAL | % | TERM | % | SURVIVAL | % | TERM | % | SURVIVAL | % |
| VARIABLE #1 | 1 | 40 | 0 | 17 | 1 | 30 | 0 | 17 | 1 | 10 | 0 | 17 | 1 | 5 | 0 | 17 |
| | 2 | 30 | 0 | 17 | 2 | 20 | 0 | 17 | 2 | 20 | 0 | 17 | 2 | 5 | 0 | 17 |
| | 3 | 15 | 1 | 17 | 3 | 20 | 1 | 17 | 3 | 20 | 1 | 17 | 3 | 10 | 1 | 17 |
| | 5 | 8 | 2 | 17 | 5 | 10 | 2 | 17 | 5 | 20 | 2 | 17 | 5 | 20 | 2 | 17 |
| | 8 | 5 | 3 | 16 | 8 | 10 | 3 | 16 | 8 | 15 | 3 | 16 | 8 | 30 | 3 | 16 |
| | 10 | 2 | 5 | 16 | 10 | 10 | 5 | 16 | 10 | 15 | 5 | 16 | 10 | 30 | 5 | 16 |
| VARIABLE #2 | 5 | 40 | 0 | 17 | 5 | 30 | 0 | 17 | 5 | 10 | 0 | 17 | 5 | 5 | 0 | 17 |
| | 10 | 30 | 1 | 17 | 10 | 20 | 1 | 17 | 10 | 20 | 1 | 17 | 10 | 5 | 1 | 17 |
| | 15 | 15 | 5 | 17 | 15 | 20 | 5 | 17 | 15 | 20 | 5 | 17 | 15 | 10 | 5 | 17 |
| | 20 | 8 | 10 | 17 | 20 | 10 | 10 | 17 | 20 | 20 | 10 | 17 | 20 | 20 | 10 | 17 |
| | 30 | 5 | 15 | 16 | 30 | 10 | 15 | 16 | 30 | 15 | 15 | 16 | 30 | 30 | 15 | 16 |
| | 50 | 2 | 25 | 16 | 50 | 10 | 25 | 16 | 50 | 15 | 25 | 16 | 50 | 30 | 25 | 16 |

130 132 124 130 132 124

GAMING DEVICE HAVING TERMINATION VARIABLES

PRIORITY CLAIM

This application is a continuation application of, claims priority to and the benefit of U.S. patent application Ser. No. 10/982,476, filed Nov. 5, 2004, which is a continuation application of, claims priority to and the benefit of U.S. patent application Ser. No. 10/429,001, filed May 2, 2003, now U.S. Pat. No. 6,814,664, which is a continuation application of, claims priority to and the benefit of U.S. patent application Ser. No. 09/966,658, filed Sep. 28, 2001, now U.S. Pat. No. 6,607,438, the entire contents of which are incorporated herein.

This application relates to the following commonly owned patent applications: "GAMING DEVICE HAVING TERMINATION VARIABLES," Ser. No. 11/830,226, and "GAMING DEVICE HAVING TERMINATION VARIABLES," Ser. No. 11/830,217.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a game in a gaming device in which a player picks selections to obtain gaming device awards until no selections remain or until a termination variable ends the game.

BACKGROUND OF THE INVENTION

In gaming machines, the games must come to an end. In a slot machine game, the game ends when the reels stop and the gaming device analyzes the symbol positions to determine if one or more winning outcomes exist. In a poker game, the game randomly deals cards, the player has one or more opportunities to randomly generate one or more new cards and the player wins or loses based on the final combination of cards. In blackjack, the player's card values add until the player's hand beats the dealer's hand, loses to the dealer's hand or busts.

In each of these well known games, the game ends after a number of random generations. In slot, the game ends after one random generation. In poker, the game ends after one, two or more random generations, depending on the type of poker game. In blackjack, the number of generations varies, but has a limit; namely, the number accumulates until the card denominations add to a desired number or exceed twenty one.

Known bonus games employ a plurality of game ending strategies. One known strategy is a do-until sequence, in which the player picks until picking a bonus terminator. European Patent Application No. EP 0 945 837 A2, filed on Mar. 18, 1999, and assigned on its face to WMS Gaming, Inc., discloses a bonus game in which a player has one or more opportunities to select masked bonus awards. When the player selects a masked award, the game reveals the selection and provides the award to the player. The player selects until selecting a game terminator.

Another known bonus game ending strategy includes letting the player decide whether to end the game with a particular result or trade results with the hope of obtaining a higher award. The TOP DOLLAR™ gaming device, which is manufactured and distributed by the assignee of this application, provides the player with three offers and a final award. When an offer is given, the player may accept or reject it. If the player accepts an offer, the player receives the accepted bonus amount and the bonus round terminates. If the player declines an offer, the game generates another offer for the player, which may be a higher or lower award. The game is similar to poker, wherein the player has a limited opportunity to better an outcome.

In each of the foregoing games, the game ends upon a limited number of random generations or upon a result of the random generations. In an effort to create a more entertaining and exciting game, a need exists to create new apparatus and methods for ending a game and combine these with the known methods described above.

SUMMARY OF THE INVENTION

The present invention provides a gaming device and in particular a primary or bonus game of a gaming device that enables players to accumulate awards until there are no more awards or until one or more termination variables reaches a predetermined limit. The gaming device includes at least one random generation device that generates awards upon a player input. The gaming device also includes one or more termination variables, each defined by a plurality of units, whereby one of the random generation devices generates an amount of units upon a player input. The termination variables each have an associated termination limit of accumulated or lost termination units, whereby a player generates awards until reaching the termination limit. The termination limit may be reached by accumulating or losing the units.

The gaming device preferably includes a plurality of termination variables, wherein each has its own termination limit of units. The game thereby enables the player to generate awards until the first of said variables reaches its termination limit of units.

The gaming device provides a number of selectors, displays them to the player and generates an award for the player when the player picks a selector. The game preferably simultaneously displays each of the selectors to the player. The game enables the player to generate awards until reaching a termination limit of units (as mentioned above) or until no unpicked selectors remain, whichever occurs first. In one embodiment, the game picks the first selector for the player. In another embodiment, the player picks the first selector.

The gaming device of the present invention is adapted to randomly assign units or a number of units for one or more of the termination variables to each selector, whereby a player receives the assigned units upon picking a selector. The gaming device is also adapted to include a pick order, wherein the game randomly assigns units or a number of units to each pick of the order, and whereby a player receives the assigned units based on which pick of the order the player makes.

In one embodiment of the present invention, the gaming device also generates survival units associated with a termination variable that counteract the units towards the termination limit of said termination variable. The game preferably randomly generates the survival units upon a player's pick of a selector. The game may be adapted to randomly assign survival units or a number of survival units to each selector, whereby a player receives the assigned survival units upon picking a selector. The game is alternatively adaptable to randomly assign a number of survival units to a pick of an order, whereby a player receives the assigned survival units based on which pick of the order that the player makes. The game also enables the player to exchange at least one gaming device award for at least one survival unit.

In one embodiment, the game also provides a selector order, whereby a player must pick at least one selector before picking at least one other selector. The present invention is adapted so that one of the selectors, and preferably the final selector of an order, has an associated jackpot award. Another embodiment of the game includes at least one set of selectors, wherein the game only enables the player to pick a predetermined proportion of the selectors in a set. The game in a further embodiment diverts the player, upon a player's pick, to pick a different selector than the picked selector. The gaming device alternatively diverts the player to a different predetermined selector.

In a multistage embodiment of the present invention, the player plays a stage of the game and advances by selecting a jackpot, surviving a number of selections or advancing to the end of a path. The player otherwise terminates the game by reaching a termination limit of units of one of the termination variables. Each stage is adapted to have a jackpot award at the end or to simply advance the player. After a predetermined number of stages, the game ends and optionally provides a final jackpot award.

The multistage embodiment includes randomly generating the advance to a subsequent stage or jackpot, such that the game can conceivably generate the advance or jackpot on the first pick of a stage. Alternatively, the player is required to advance along a certain predetermined path or survive a predetermined number of picks. The common element in each multistage implementation is that the player plays against the termination variables, which tend towards game termination with each pick of a selector.

It is therefore an advantage of the present invention to provide a gaming device in which a player continues to pick selectors for gaming device awards until no unpicked selectors remain or until a termination variable ends the game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 6A and 6B are tables that illustrate at least portions of award databases, which the present invention employs to generate an award.

FIGS. 7A, 7B, 7C, 7D and 7E are tables that illustrate at least portions of termination and survival unit databases, which the present invention employs to generate termination and survival units.

DETAILED DESCRIPTION OF THE INVENTION

Gaming Device and Electronics

Figure 1A:
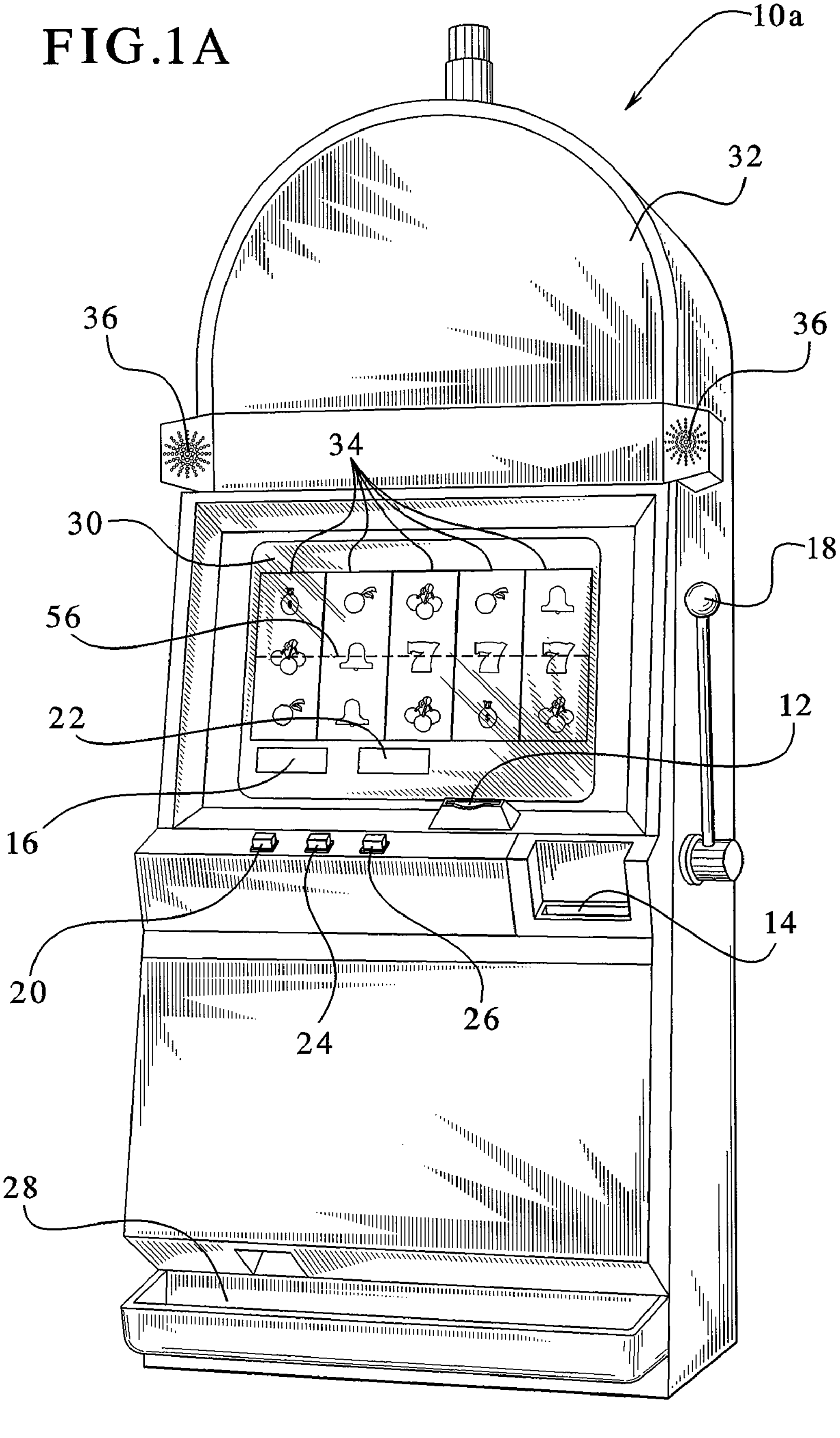
FIG. 1A is a front-side perspective view of one embodiment of the gaming device of the present invention.
Figure 1B:
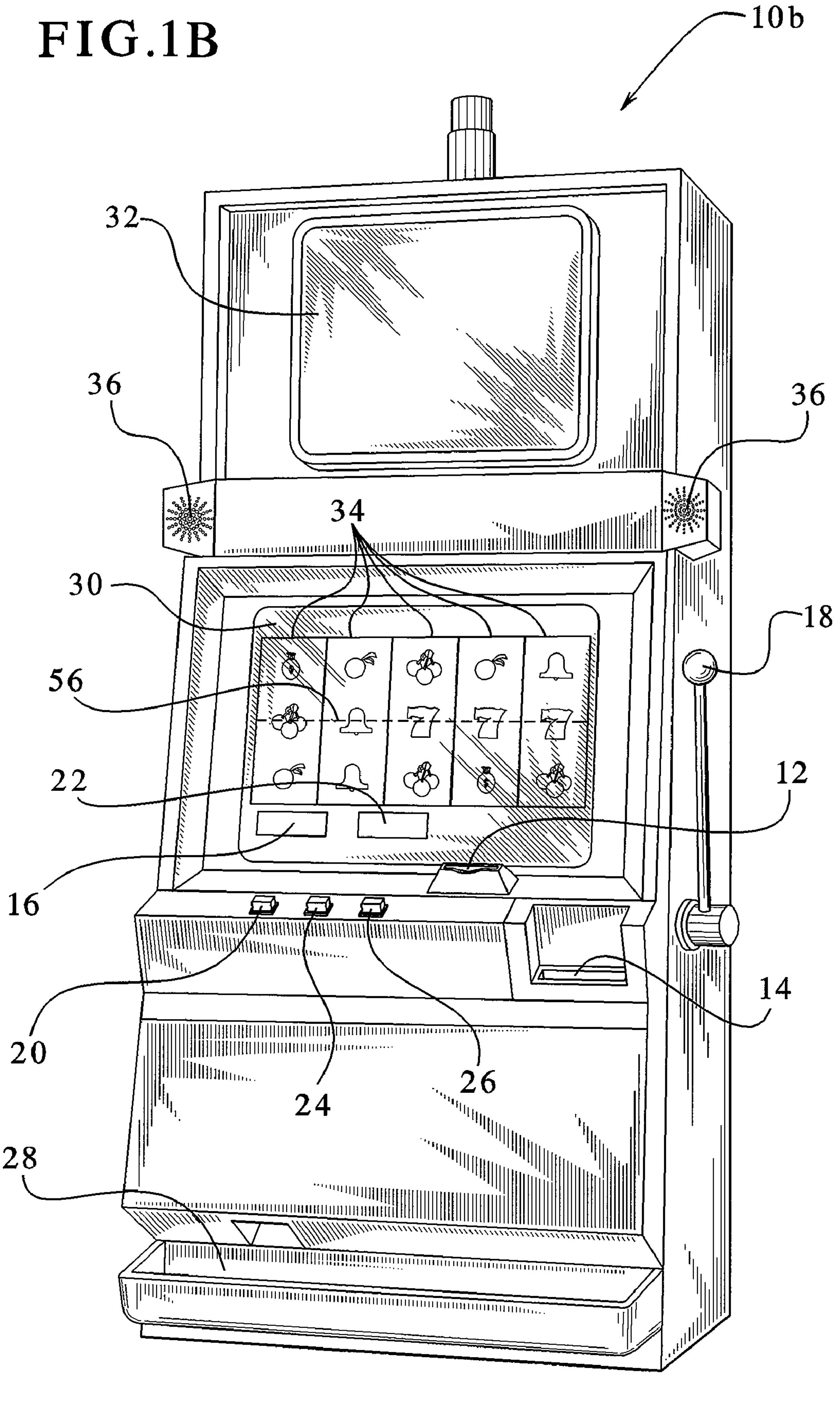
FIG. 1B is a front-side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
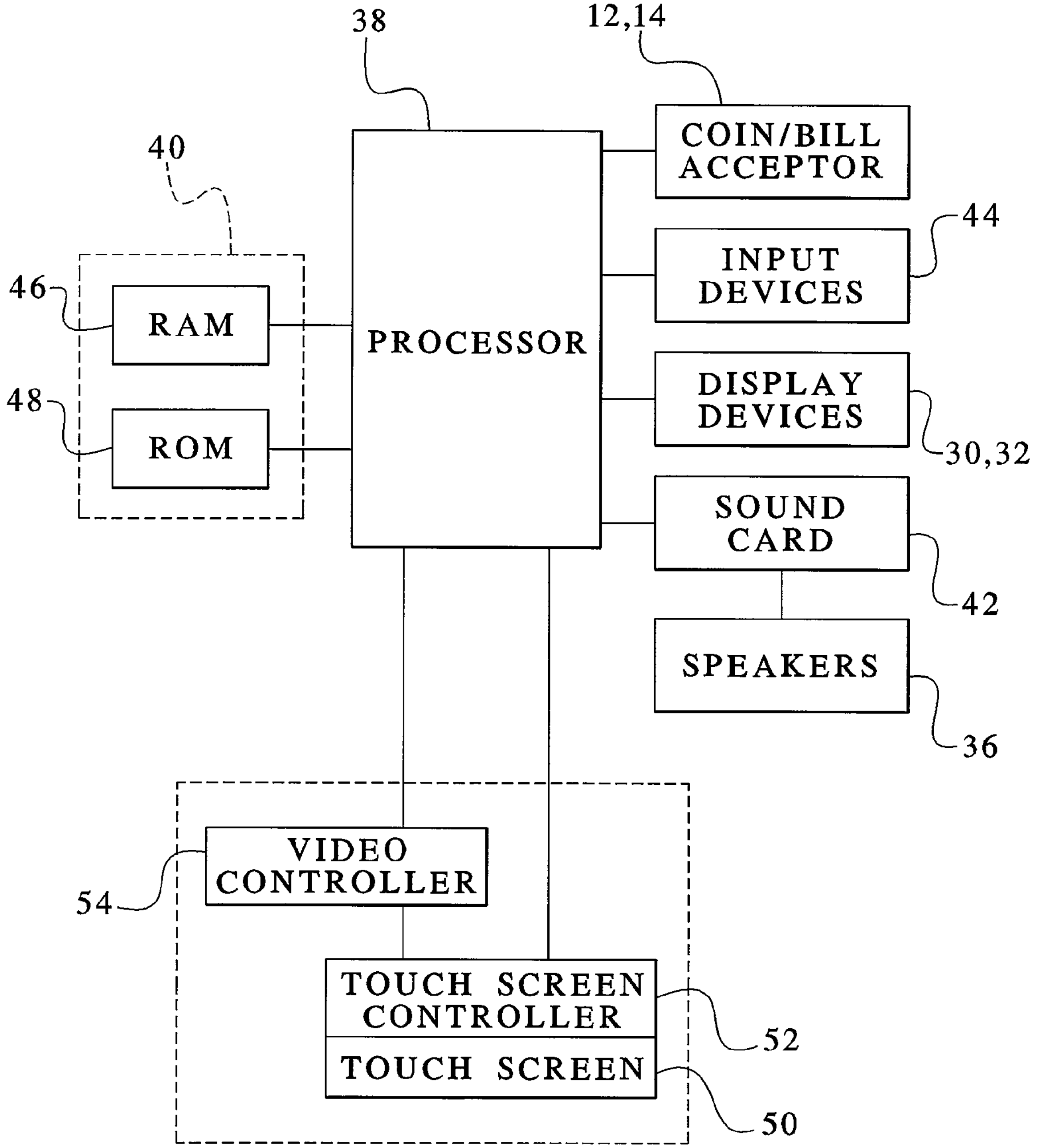
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Termination Variables

Figure 3:
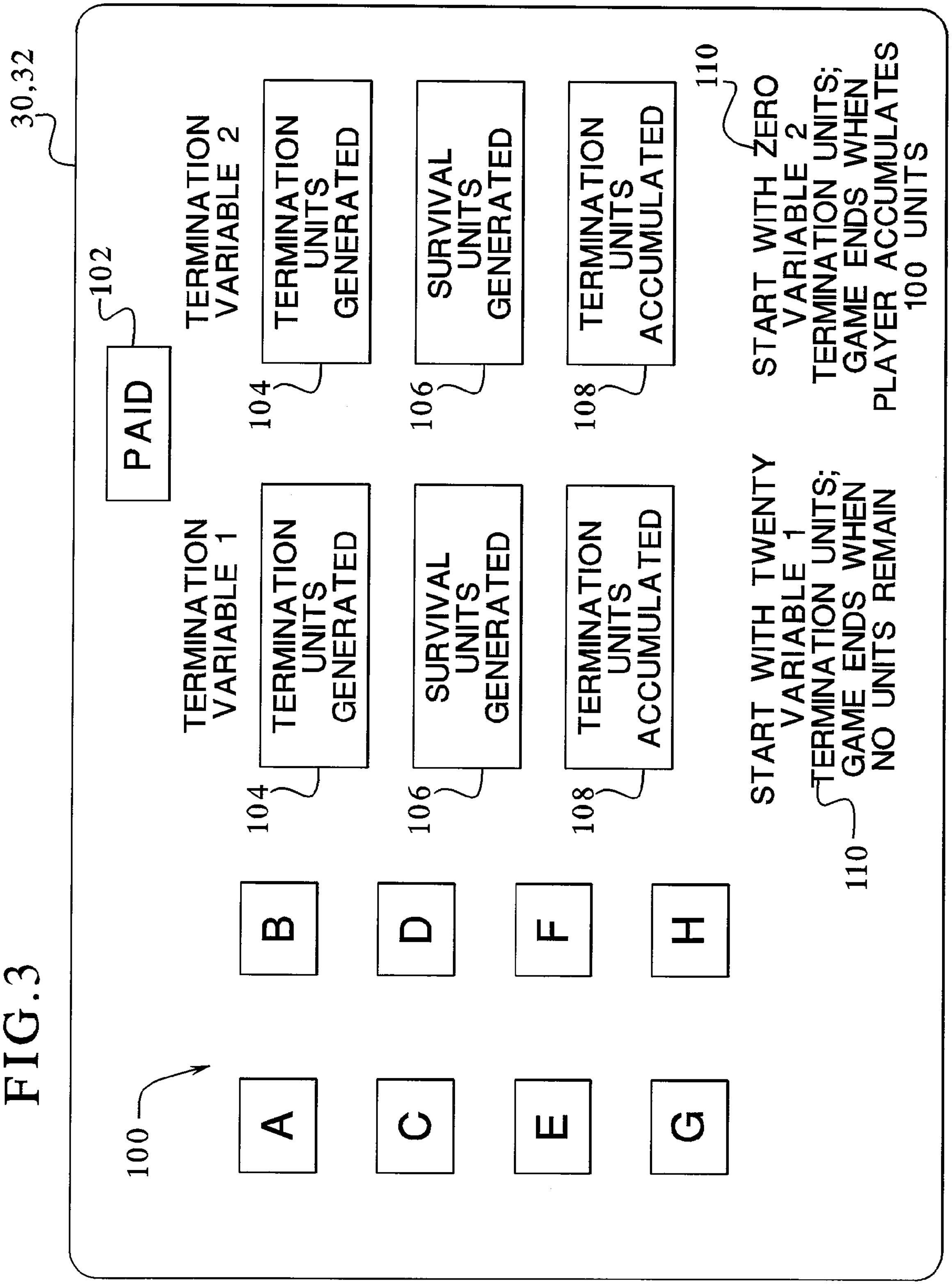
FIG. 3 is a front elevational view of one of the display devices of FIGS. 1A and 1B, which illustrates one general embodiment of the present invention.

Referring now to FIG. 3, one general embodiment of the present invention includes a display on a display device 30 or 32 having a plurality of selectors 100, a paid display 102 and a plurality of termination variables, Termination Variable #1 ("variable 1") and Termination Variable #2 ("variable 2"). The selectors 100, which are displayed generally as selectors "A" through "H" are preferably simulated selectors on the display device 30 or 32, and the display device preferably includes a touch screen 50 and associated touch screen controller 52. Each selector is thus a separate area of the display device adapted such that when a player touches an area, the touch screen 50 and controller 52 send a discrete input to the processor 38.

The selectors "A" through "H" are alternatively electromechanical input devices 44 (FIG. 2) mounted to the cabinet of the gaming device 10. The electromechanical selectors are adapted such that when a player presses a selector, the input device 44 typically closes a circuit (not illustrated), which enables a discrete input to be sent to the processor 38. The example in FIG. 3 includes eight selectors 100; however, the present invention includes providing any number of selectors, which display any indicia desired by the implementor.

The paid display 102 is preferably a simulated indicator on the display device 30 or 32, as illustrated, but is alternatively an electromechanical device mounted to the cabinet of the gaming device 10. The paid display 102 indicates the value of a recent award paid to the player and is distinguishable from the credit display 16, which shows the recent award plus the player's previous total award. The display devices 30 or 32 of the present invention preferably include other indicators and selectors (not illustrated) associated with the base games of slot, poker, blackjack, keno, etc., or with a stand alone embodiment.

The present invention includes a plurality of indicators associated with the termination variables 1 and 2. The variables include a termination unit indicator 104 that displays a generation of termination units. While the termination variables are being described generally, it should be appreciated that in one preferred implementation, the termination variables represent physical items associated with the theme of the gaming device 10. For instance, one termination variable may be water, wherein a termination unit includes any unit of water such as a quart or gallon.

The game generates the termination units and displays them in the indicator 104. When the game generates a predefined number of the termination units, the game ends. The termination units displayed as positive values in the indicator 104 are thus detrimental to the player.

The game also generates survival units and displays them in the indicator 106. The survival units counteract or offset the termination units. The survival units, which are also displayed as positive values, are displayed in the indicator 106 are thus desirable for the player. The accumulation indicator 108 displays the accumulation of any termination units and survival units, which indicates how close the game is to termination based on termination variable 1. The indicators include displaying numbers, gauges, meters, graphs, pie-charts or any other percent full or percent empty method of indication. The termination limit could start at zero and increase or start at a fixed amount and decrease.

The display 110 of variable 1 includes a termination limit such as twenty, which is the amount of termination units that the player must, in this example, lose for the game to terminate. The display 110 of variable 1 illustrates a decreasing variable, wherein the termination units subtract from a starting number which is the termination limit, and the survival units add back to the accumulation. For instance, in a desert survival theme game, if the variable is water, the units are gallons, the player initially starts with twenty gallons of water and loses and/or gains gallons of water upon successive random generations. When the accumulation indicator 108 displays zero units, the game ends. It should also be appreciated that partial units or different units, such as quarts, may also be employed.

The display 110 of variable 2 includes a termination limit such as one hundred, which is the amount of termination units that the player must in this example accrue for the game to terminate based on termination variable 2. The display 110 of variable 2 illustrates an increasing variable, wherein the termination units add from a starting number such as zero, and the survival units subtract from the accumulation. In the desert survival theme game, if the variable 2 is sunburn and the units are hours, the player initially starts with no hours of sunburn and gains and/or loses hours of sunburn upon successive random generations. When the accumulation indicator 108 displays one hundred units, the player dies from sunburn and the game ends.

The present invention includes any number of termination variables. The general embodiment of FIG. 3 has two variables, however, the present invention contemplates other embodiments providing one or many variables. When the game includes more than one variable, the game preferably terminates when the units of one of the variables reach the variable's termination limit. That is, in FIG. 3, the game ends when no variable 1 termination units remain or the game accrues one hundred variable 2 termination units, whichever occurs first.

Figure 4A:
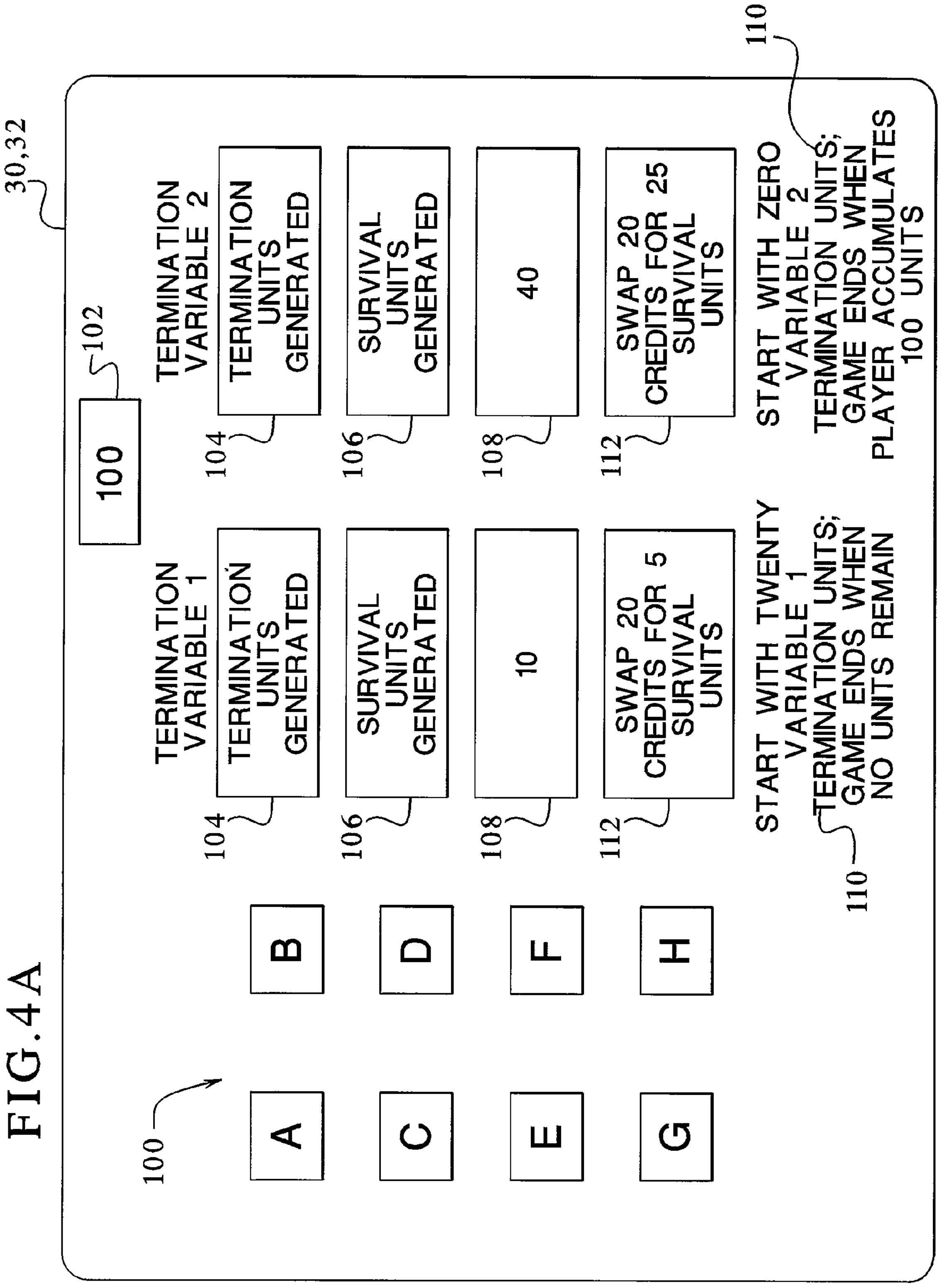
FIGS. 4A, 4B and 4C are front elevational views of one of the display devices of FIGS. 1A and 1B illustrating one alternative of the general embodiment of FIG. 3, which includes an award exchange feature.
Figure 4B:
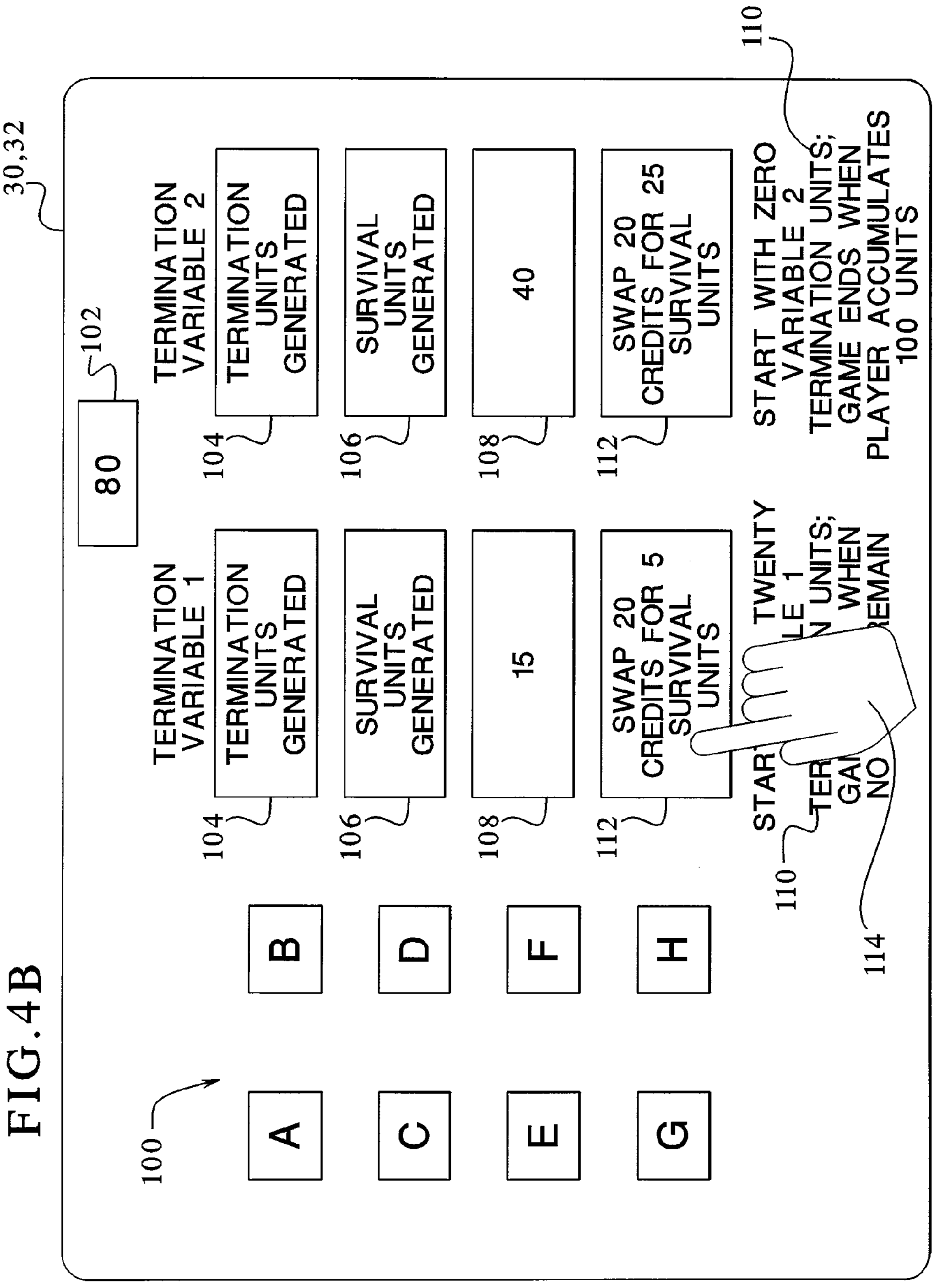
Figure 4C:
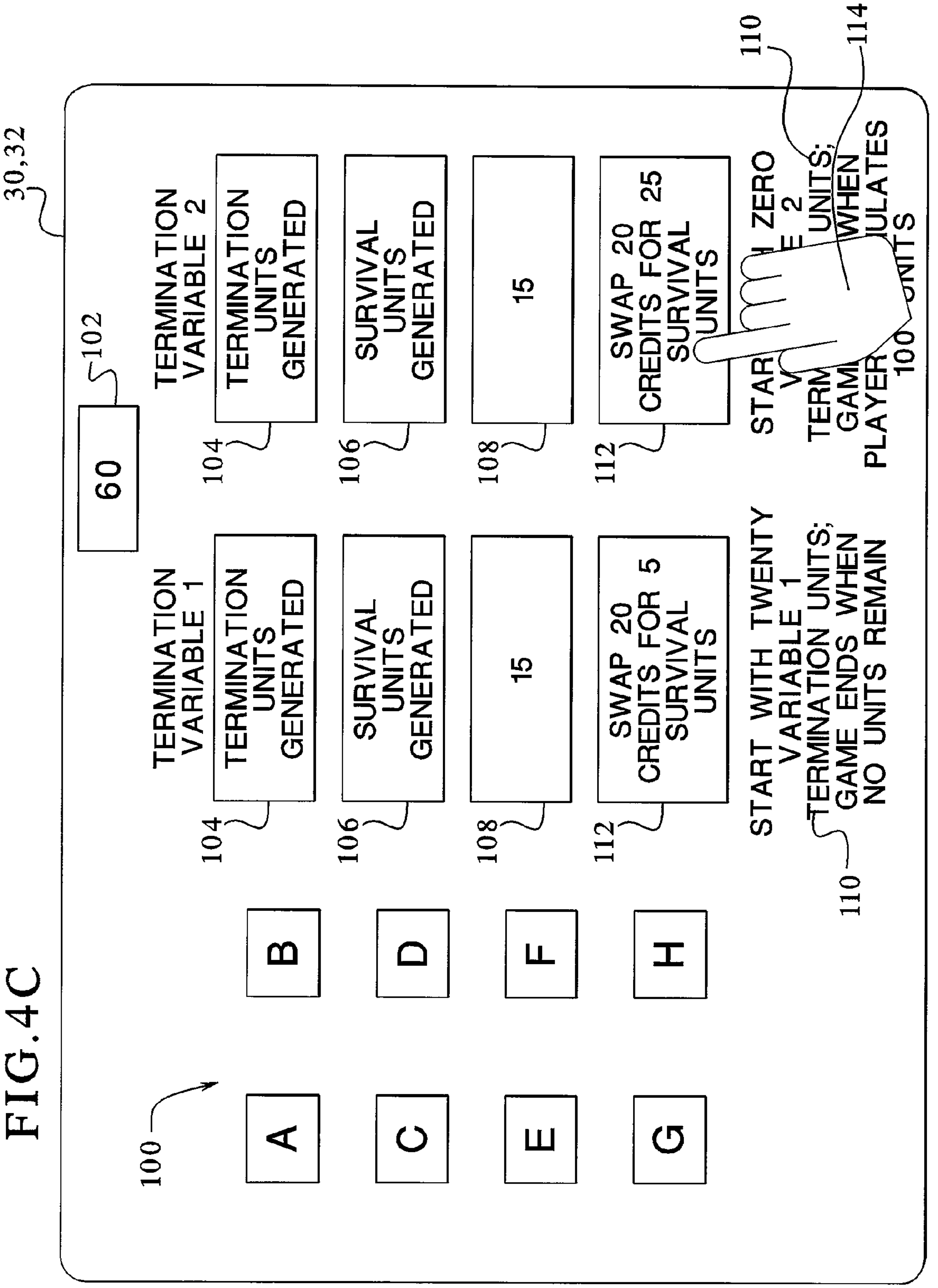

Referring now to FIGS. 4A through 4C, one alternative of the general embodiment of FIG. 3 includes a display on a display device 30 or 32 having the above described selectors and an award exchange selector 112 associated with the variables 1 and 2. In FIG. 4A, the award exchange selector 112 for variable 1 enables the player to exchange twenty awards for five survival units. The award exchange selector 112 for variable 2 enables the player to exchange twenty awards for twenty-five survival units. The present invention includes providing an award exchange selector 112 for one, more than one or all the variables. The game includes an award exchange selector 112 charging or debiting the player any desired amount of awards such as twenty awards for both variables.

As illustrated in FIG. 4A, the game includes an award exchange yielding different amounts of survival units for different variables. The rate of exchange preferably comports with the game math developed by the game implementor. Since, the termination limit for variable 2 (100) is five times greater than the termination limit for variable 1 (20), the exchange rate preferably provides more survival units per award for variable 2 than for variable 1. It should also be appreciated that one exchange could relate to two or more of the variables.

FIG. 4B illustrates the player 114 selecting the award exchange selector 112 for variable 1. The game deducts twenty awards from the paid display 102 and adds five survival units to the accumulation indicator 108, per the exchange rate displayed on the award exchange selector 112 for variable 1, as illustrated by FIGS. 4A and 4B. Since variable 1 is a decreasing variable (e.g., 20 units to zero), adding survival units benefits the player.

FIG. 4C illustrates the player 114 selecting the award exchange selector 112 for variable 2. The game deducts twenty more awards from the paid display 102 and subtracts twenty-five survival units from the accumulation indicator

108, per the exchange rate displayed on the award exchange selector 112 for variable 2, as illustrated by FIGS. 4A and 4C. Since variable 2 is an increasing variable (e.g., zero to 100 units), subtracting survival units benefits the player.

In FIGS. 4A through 4C, the game debits awards from the paid display 102, which as described above, indicates the value of an award or bonus award attained by the player during the present game play or round and is distinguishable from the credit display 16, which shows the player's previous total award. In a bonus game, the game preferably only debits awards that the player accrues during the bonus game and does not reach to the player's base game awards or credits. In a stand alone or primary embodiment, the game alternatively includes debiting awards from the credit display 16.

FIGS. 4A through 4C each display the award exchange selectors 112. In a bonus game embodiment, the game includes enabling the exchange selectors at all times, as long as the player accrues the debit amount in the bonus round. To display accrued bonus round awards, the game contemplates the paid display 102 accruing bonus round awards, similar to the credit display 16, but only for the bonus round. The game alternatively includes enabling the exchange selectors 112 only after the game pays out a gaming device win, displayed in the paid indicator 102, of at least the debit amount. In the latter embodiment illustrated in FIGS. 4A through 4C, the player is enabled to select one of the exchange selectors 112 after winning at least twenty awards and is enabled to select both of the exchange selectors 112 after winning at least forty awards.

The present invention includes enabling the player to select one or both award exchange selectors 112 a plurality of times as long as the player has a sufficient amount of awards to debit. The present invention also contemplates a cap or limit, such that the game does not accumulate a negative number of units in an increasing variable embodiment or surpass an initial starting point in a decreasing variable embodiment.

The present invention also includes randomly enabling the player to exchange awards for survival units. In a random exchange embodiment, the game first qualifies the exchange by ensuring that the player has enough awards to exchange. A flowchart illustrating a random award for unit exchange is discussed below. The present invention also contemplates any suitable manner for obtaining survival units.

Figure 5A:
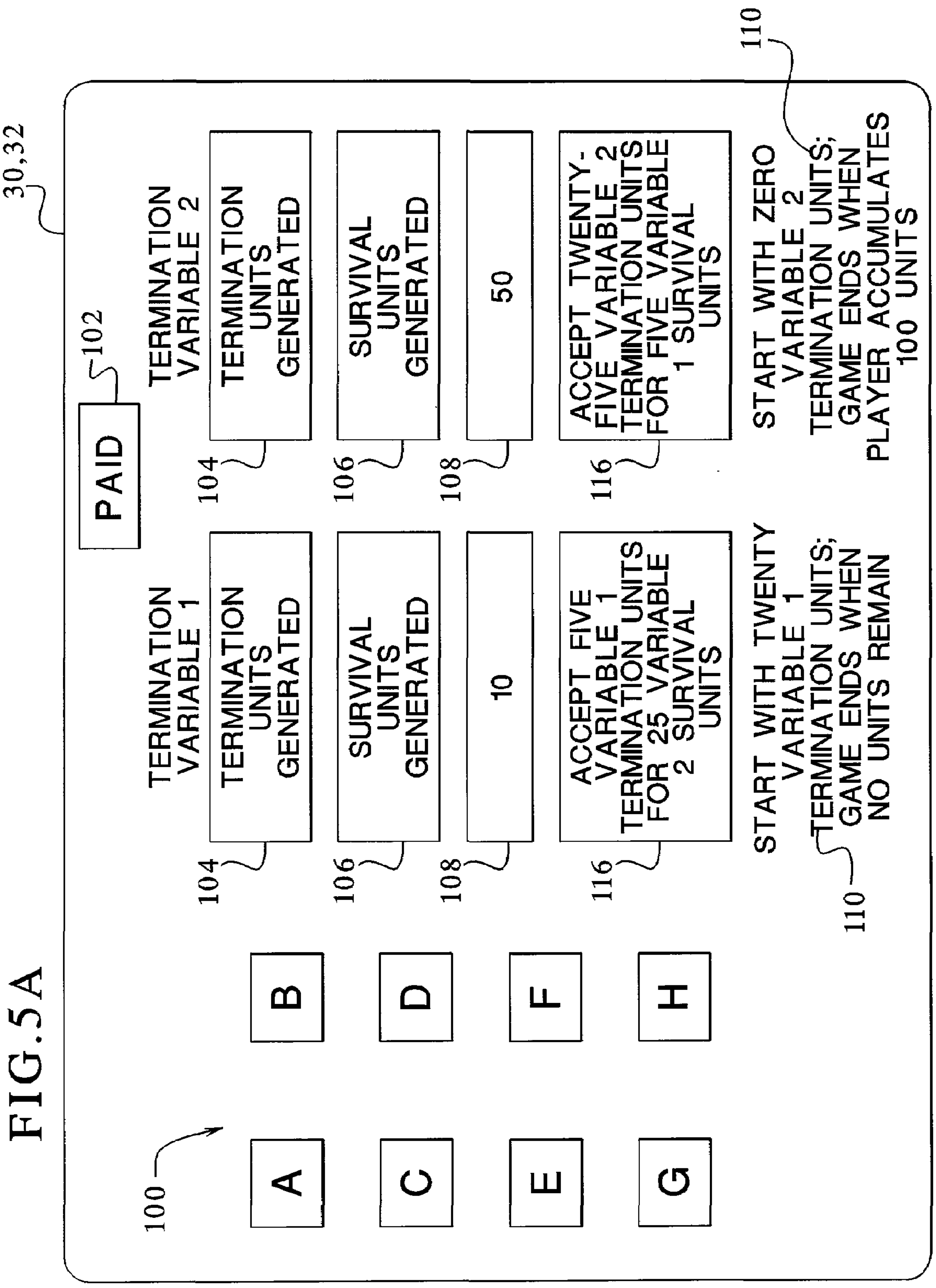
FIGS. 5A, 5B and 5C are enlarged front elevational views of one of the display devices of FIGS. 1A and 1B illustrating one alternative of the general embodiment of FIG. 3, which includes a unit exchange feature.
Figure 5B:
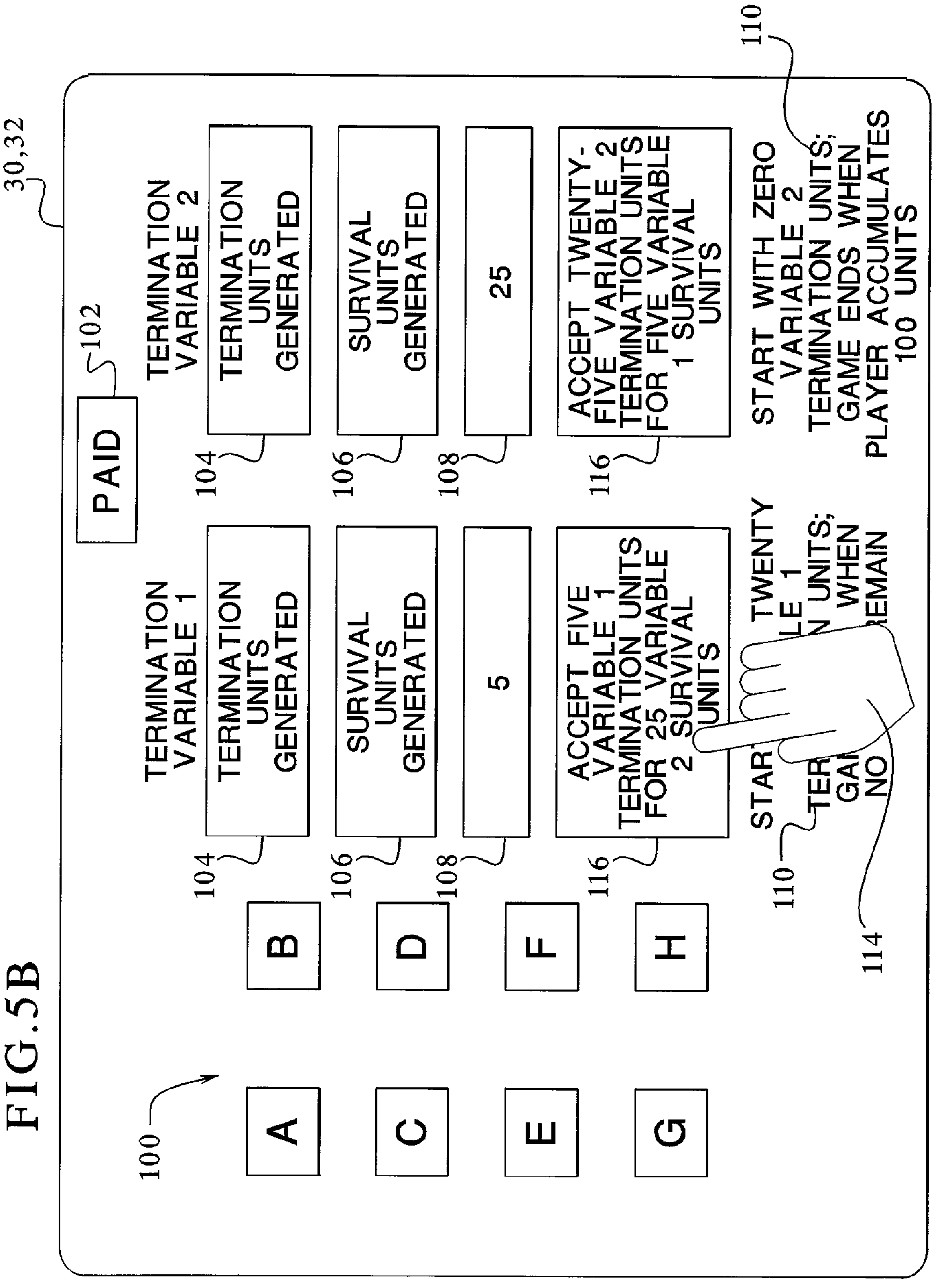
Figure 5C:
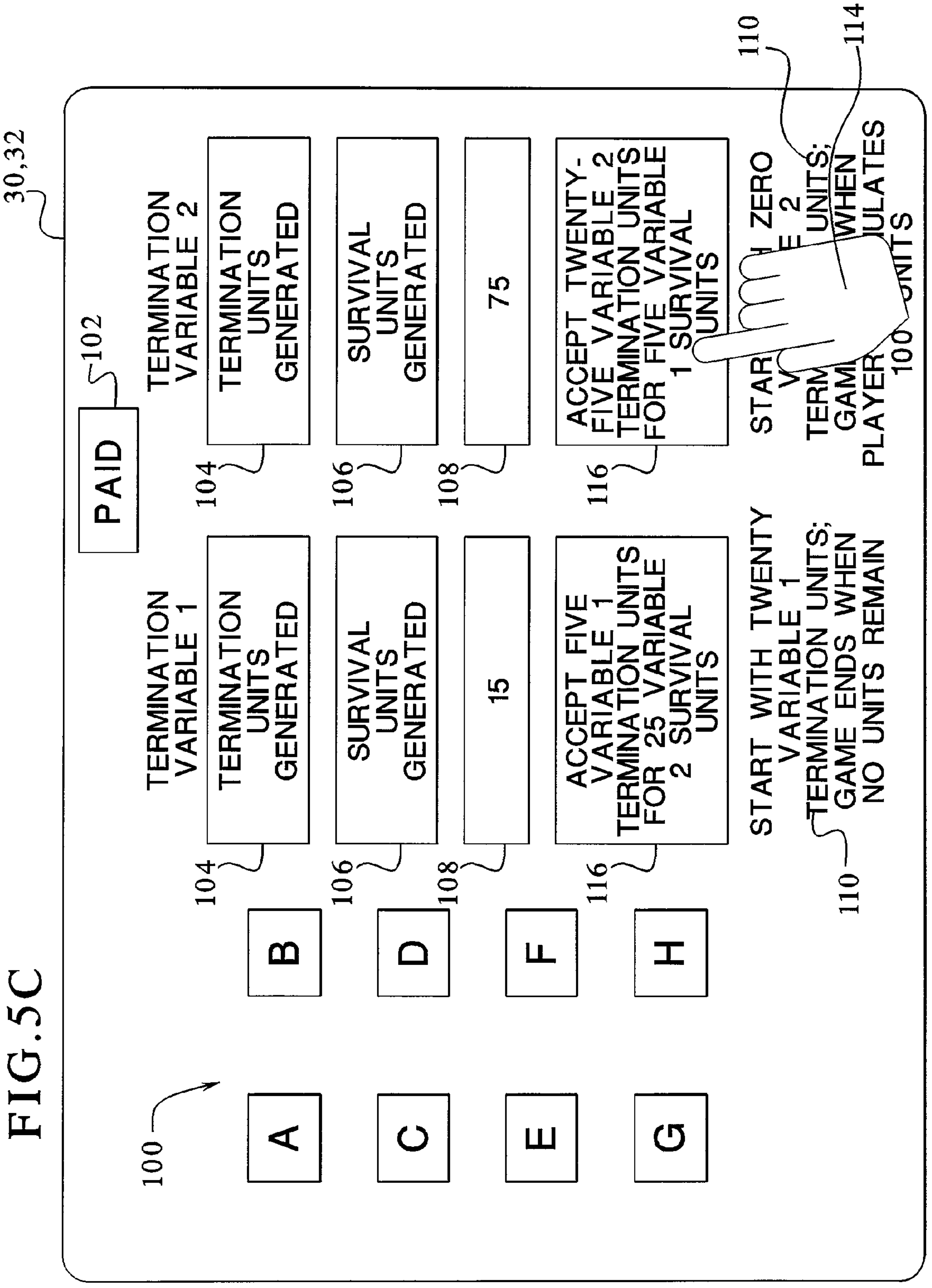

Referring now to FIGS. 5A through 5C, one alternative of the general embodiment of FIG. 3 includes a display on a display device 30 or 32 having the above described selectors and a unit exchange selector 116 associated with the variables 1 and 2. In FIG. 5A, the unit exchange selector 116 for variable 1 enables the player to accept five variable 1 termination units in exchange for gaining twenty-five variable 2 survival units. The unit exchange selector 116 for variable 2 enables the player to accept twenty-five variable 2 termination units in exchange for gaining five variable 1 survival units.

The game includes providing a unit exchange selector 116 for one, more than one, or all the variables. The game includes the unit exchange selector 116 having any exchange rate such as 1:5 for variable 1 and 5:1 for variable 2. As illustrated in FIG. 5A, the game includes two variables having exchange selectors 116 with inversely proportional exchange rates. The exchange rates preferably comport with the game math developed by the game implementor. The present invention also contemplates non-reciprocal exchanges such as variable 1 exchanges with variable 2, variable 2 exchanges with variable 3 and variable 3 exchanges with variable 1.

FIG. 5B illustrates the player 114 selecting the unit exchange selector 116 for variable 1. The game deducts five termination units from the accumulation indicator 108 of variable 1 and subtracts twenty-five survival units from the accumulation indicator 108 of variable 2, per the exchange rate displayed on the unit exchange selector 116 for variable 1, as illustrated by FIGS. 5A and 5B. Since variable 1 is a decreasing variable (e.g., twenty to zero units), subtracting termination units debits the player. Since variable 2 is an increasing variable (e.g., zero to 100 units), subtracting units benefits the player.

FIG. 5C illustrates the player 114 selecting the unit exchange selector 116 for variable 2. The game adds twenty-five termination units to the accumulation indicator 108 of variable 2 and adds five survival units to the accumulation indicator 108 of variable 1, per the exchange rate displayed on the unit exchange selector 116 for variable 2, as illustrated by FIGS. 5A to 5C. Since variable 2 is an increasing variable, adding termination units is detrimental to the player. Since variable 1 is a decreasing variable, adding survival units benefits the player.

In FIGS. 5A through 5C, the game enables the player to exchange units from one variable to another regardless of the awards that the game displays in the paid display 102 or credit display 16. In a bonus or stand alone embodiment, the game includes enabling the player to select a unit exchange selector 116 a plurality of times as long as the player has a sufficient amount of units to exchange. The game further includes a cap or limit, such that the game does not accumulate a negative number of units in an increasing variable embodiment, surpass an initial unit starting point in a decreasing variable embodiment or enable a player to end the game via an exchange. In a bonus or stand alone embodiment, the game further includes randomly enabling the player to exchange units between variables. A flowchart illustrating a random unit for unit exchange is discussed below.

Databases

Referring now to FIG. 6A, an award table 118 illustrates at least a portion of an award database that one embodiment of the present invention employs to generate an award. The award table 118 includes a plurality of awards 120 having any desired predetermined distribution of values. The awards 120 include game credits, credit multipliers or modifiers or represent other items of value such as a number of picks from a prize pool. The present invention includes enabling or not enabling the game to randomly generate the same award 120 a plurality of times.

The present invention includes adapting the game to randomly generate awards 120 from the award table 118 using one of two methods. In a first award generation embodiment, the game randomly assigns an award to each of the selectors 100 "A" through "H" of FIGS. 3, 4A through 4C and 5A through 5C. For example, the game randomly assigns the 4 award to the "A" selector, the 20 award to the "B" selector, etc., before the player begins picking selectors. The game then generates an award depending upon which selector 100 the player picks. In this embodiment, the game is enabled to reveal the awards 120 of unpicked selectors when the game terminates. The first embodiment includes enabling or not enabling the player to pick the same selector 100 a plurality of times.

In a second award generation embodiment, the game randomly assigns an award to a pick of an order. That is, the player makes a first pick, a second pick, a third pick, etc. The game randomly assigns, e.g., the 4 award to the first pick, the 20 award to the second pick, etc. The present invention includes the game randomly assigning awards to a plurality or all of the picks before the player begins picking selectors or alternatively assigning each award directly after the player picks a selector. In this embodiment, the selector that the player picks is irrelevant to the player's award. Picking the same selector twice likely generates different awards. The second embodiment also includes enabling or not enabling the player to repeatedly pick the same selector 100.

Referring now to FIG. 6B, an award table 122 illustrates at least a portion of an alternative award database that the present invention employs to generate an award. The award table 122 includes a plurality of awards 120 having any desired predetermined distribution of values. The awards 120 each include an associated percentage 124 that the game will select the particular award. The game contemplates percentages 124 having any desired distribution, wherein the percentages preferably add to 100%. In the award table 122, the game is twice as likely to select one of the 15, 20, 25 or 30 awards as it is to select any other award.

Referring now to FIGS. 7A and 7B, termination and survival unit tables 126 and 128 illustrate at least a portion of termination and survival unit databases that one embodiment of the present invention may employ to generate termination and survival units. The game employs a different database for each variable when, as in FIGS. 3, 4A through 4C and 5A through 5C, different variables have different termination limits, i.e., 20 for variable 1 and 100 for variable 2. In such a case, the variable having a larger termination limit tends to generate larger amounts of units, so that each variable has a roughly equal opportunity to terminate the game. When different variables have the same or substantially similar termination limits, the present invention contemplates employing the same table for the different variables. The present invention includes enabling or not enabling the game to generate the same number of termination and/or counteracting units a plurality of times.

The unit table 126 of FIG. 7A includes a plurality of termination unit amounts 130 and survival units amounts 132. The game preferably randomly generates numbers from each column of the unit table 126 independently. That is, on a given play with respect to variable one, the game generates, e.g., five termination units 130 and no survival units 132 for a net of five termination units. On another play with respect to variable one, the game generates, e.g., one termination unit 130 and five survival units for a net of four survival units.

The unit table 128 of FIG. 7B also includes a plurality of termination unit amounts 130 and survival unit amounts 132. The game employs unit table 128 in the same manner as the unit table 126. As stated above, since the termination limit for variable 2 (of FIGS. 3, 4A through 4C and 5A through 5C) is five times greater than the termination limit of variable 1, the unit amounts generally follow in such a manner. The implementor, however, creates each table in accordance with the game math and employs any desired distribution. On a play with respect to variable 2, the game generates, e.g., thirty termination units 130 and ten survival units for a net of twenty termination units.

As with randomly generating awards, the present invention includes adapting the game to randomly generate units 130 and 132 from the unit tables 126 and 128 using one of two methods. In a first unit generation embodiment, the game randomly assigns units, for each variable, to each of the selectors 100 "A" through "H" of FIGS. 3, 4A through 4C and 5A through 5C. For example, the game randomly assigns eight termination units and two survival units from the unit table 126 to variable 1 and thirty termination units and twenty-five survival units from the unit table 128 to variable 2 for the "A" selector. The game randomly assigns, e.g., two termination units and zero survival units from the unit table 126 to variable 1 and fifty termination units and five survival units from the unit table 128 to variable 2 for the "B" selector. The game then generates units depending upon which selector 100 the player picks. In this embodiment, the game is enabled to reveal the termination units 130 and survival units 132 of unpicked selectors when the game terminates.

In a second unit generation embodiment, the game randomly assigns units to a pick of an order, e.g., a first pick, a second pick, a third pick, etc. The game randomly assigns, e.g., two termination units and zero survival units from the unit table 126 to variable 1 and fifty termination units and five survival units of the unit table 128 to variable 2 for the first pick. The game randomly assigns, e.g., eight termination units and two survival units from the unit table 126 to variable 1 and thirty termination units and twenty-five survival units from the unit table 128 to variable 2 for the second pick. The present invention includes the game randomly assigning units to a plurality or all of the picks before the player begins picking selectors or alternatively assigning the units directly after the player picks a selector. In this embodiment, the selector that the player picks is irrelevant to the units the game generates. Picking the same selector twice likely generates different units.

Referring now to FIGS. 7C and 7D, termination and survival unit tables 134 and 136 illustrate at least a portion of alternative termination and survival unit databases that the present invention may employ to generate termination and survival units. The unit tables 134 and 136 include a plurality of termination units 130 and survival units 132 having any desired predetermined amount distribution. The units 130 and 132 each include an associated likelihood percentage 124 that the game selects the particular unit.

The game contemplates likelihood percentages 124 having any desired distribution, wherein the percentages preferably add to 100%. In the unit table 134 for variable 1, the game, e.g., is twice as likely to select five termination units than ten termination units. The game is also twice as likely to select one survival unit than three survival units. In the unit table 136 for variable 2, the game, e.g., is twice as likely to select twenty termination units than fifty termination units. The game is also twice as likely to select five survival units than eight survival units.

Referring now to FIG. 7E, a termination and survival unit table 138 that illustrates at least a portion of a further alternative termination and survival unit database that the present invention employs to generate termination and survival units. The unit table 138 includes, for both variables 1 and 2, a plurality of termination units 130 and a plurality of survival units 132, wherein each include an associated likelihood percentage 124 that the game will select the particular unit. The table 138 includes a separate database for pick #1, pick #2, pick #3 and pick #4. The table includes as many picks as desired by the implementor or that are possible in a game of the present invention.

The present invention employs table 138 in an embodiment, wherein the game assigns units to a particular pick of an order as opposed to a particular selector 100. The present invention includes making advancement more difficult as the player advances. One way to cause this effect is to shift the percentages in favor of generating more termination units 130 in later picks, while maintaining the same likelihood of generating survival units 132 for each of the picks. For example, for variable 1 there exists a 2% chance of generating ten termination units in pick 1, a 10% chance in pick 2, a 15% chance in pick three and a 30% chance in pick 4. Meanwhile, each pick maintains a 16% chance of generating five survival units.

Viewing the award tables 118 and 122 and the termination and survival unit tables 126, 128, 134 136 and 138 together, it becomes apparent that in one embodiment when the player picks a selector, the game reveals an award 120, a number of termination units 130 and a number of survival units 132. This is so regardless of whether the game assigns values to selectors 100 or to picks. As disclosed in connection with tables 126, 128, 134, 136 and 138, certain survival unit entries can be zero, so that when the player picks a selector 100, the game generates a positive award 120 a positive number of termination units 130 and no or zero survival units 132. In other embodiments, the award tables 118 and 122 may include one or more zero award entries. Further, the unit tables 126, 128, 134, 136 and 138 may include one or more zero termination unit entries. The player can thereby receive zero awards 120 and/or zero termination units 130 regardless of whether the game assigns values to selectors 100 or picks.

The effects of the zero value entries are as follows. On any given pick of a selector 100, the player may: (i) receive an award 120, a number of termination units 130 and a number of survival units 132; (ii) receive an award 120 and no termination or survival units; (iii) receive an award 120, a number of termination units 130 and no survival units 132; (iv) receive an award 120, a number of survival units 132 and no termination units 130; (v) receive no award, a number of termination units 130 and a number of survival units 132; (vi) receive no award, a number of termination units 130 and no survival units 132; and (vii) receive no award, a number of survival units 132 and no termination units 130. On any given pick of a selector 100 the game preferably provides some response, i.e., generates at least one of a number of awards, termination units or survival units.

It should be appreciated that one skilled in the art can derive many methods of making the attainment of subsequent picks more difficult. One method specifically contemplated by the present invention is to maintain constant percentages for the termination units 130 while shifting the percentages in favor of generating less survival units 132 in later picks. Another method is to shift the percentages in favor of generating more termination units 130 in later picks and to shift the percentages in favor of generating less survival units 132 in later picks. A further method is to increase the average selectable amount of the termination units 130 and/or decrease the average selectable amount of the survival units 132 in later picks.

Other methods that change the difficulty level are also contemplated by the present invention. For example, in one embodiment, the game employs one of the disclosed methods that make obtaining subsequent picks more difficult for a number of picks and thereafter makes obtaining subsequent picks less difficult. Each of the methods for making obtaining subsequent picks more difficult can be inverted to make obtaining subsequent picks less difficult. For example, the game in one implementation generates less termination units 130 in subsequent picks. In another implementation, the game increases the survival units 132. In still another, the game decreases the termination units 130 and increases the survival units 132.

Through these methods, the game in an embodiment initially makes obtaining subsequent picks more difficult and then switches so that subsequent picks are easier to obtain. The game in one implementation does this linearly. In another implementation, the game employs a bell curve.

In another embodiment, the game makes obtaining subsequent picks easier or more generous and then switches so that subsequent picks are harder to obtain. The game may again be adapted to carry out this embodiment linearly or non-linearly. The game in another embodiment switches back and forth between making the attainment of subsequent picks easier and more difficult.

Method for Randomly Generating Credit or Unit Exchange Option

Figure 8:
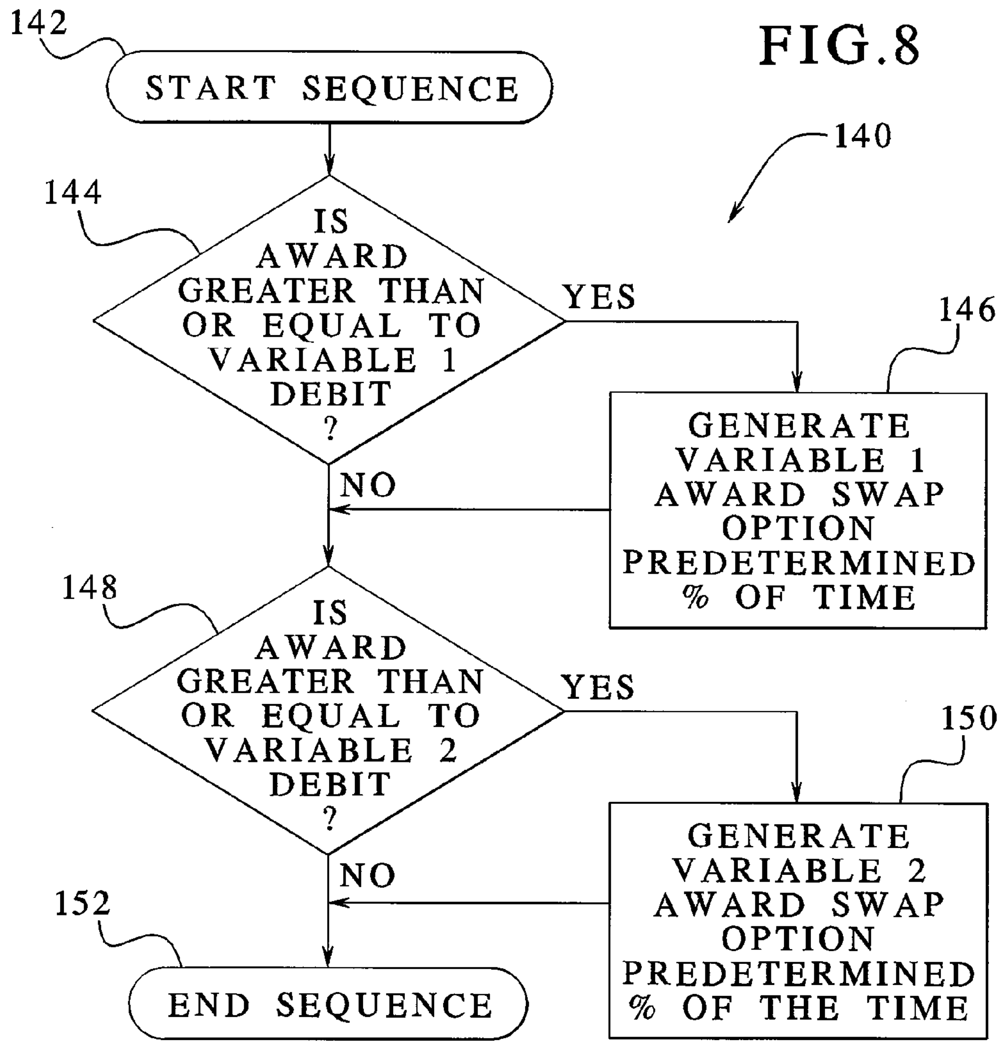
FIG. 8 is schematic flow diagram illustrating one method for randomly enabling a player to exchange awards for survival units.

As stated above with respect to FIGS. 4A through 4C and FIGS. 5A through 5C, the present invention includes randomly enabling a player to exchange awards for survival units for one or more variables and/or exchange termination units between variables. Referring now to FIG. 8, one method 140 for randomly enabling a player to exchange awards for survival units begins upon a sequence triggering event, as indicated by the oval 142. One sequence triggering event includes any player input that triggers an award generation. A sequence triggering event otherwise includes any desired by the implementor, such as the generation of a particular award or the generation of a particular number of awards such as after every three generations.

Upon a sequence triggering event, the game determines whether the player's awards are greater than or equal to a variable 1 debit amount, as indicated by the diamond 144. The game includes determining whether a single generated award (paid display 102) is greater than or equal to a variable 1 debit or whether an accumulated award (credit display 16) meets or exceeds the debit amount. If so, the game generates a variable 1 award exchange option a predetermined percentage of the time, e.g., 30%, as indicated by the block 146.

The game performs the analysis of the method 140 for each variable of the game. The game determines whether the player's awards are greater than or equal to a variable 2 debit amount, as indicated by the diamond 148. The game again includes determining whether a single generated award is greater than or equal to a variable 2 debit or whether an accumulated award meets or exceeds the debit amount. If so, the game generates a variable 2 award exchange option a predetermined percentage of the time, such as 35%, as indicated by the block 150. If the game includes only two variables, the sequence ends, as indicated by the oval 152. It should be appreciated that the present invention includes any number of different variables having different sequence triggering events. For the ease of illustration, variables 1 and 2 are not illustrated as having different sequence triggering events, as indicated by the oval 142.

Figure 9:
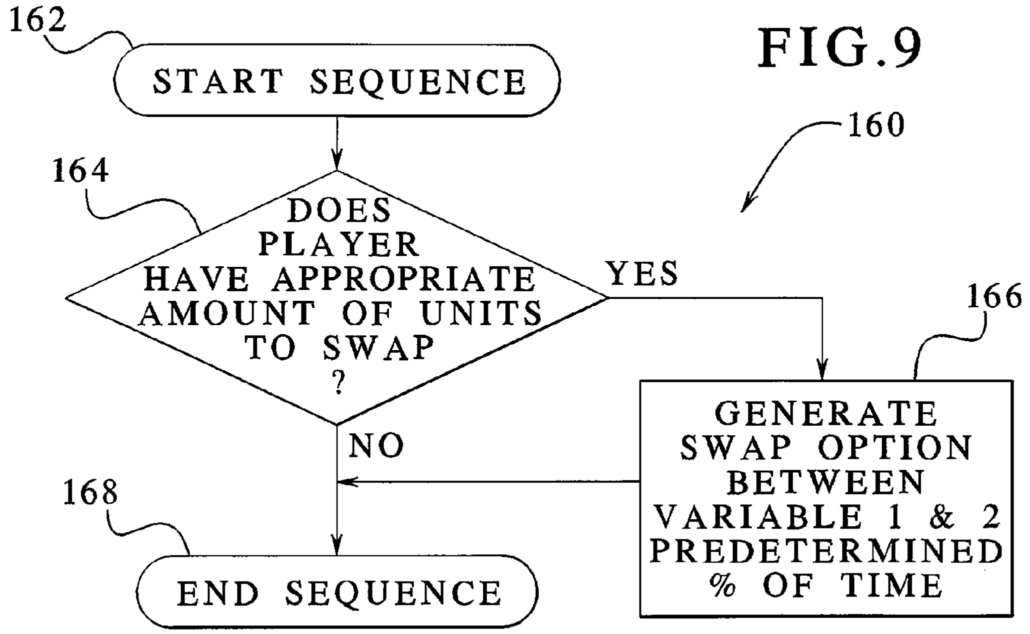
FIG. 9 is schematic flow diagram illustrating one method for randomly enabling a player to exchange termination units between variables.

Referring now to FIG. 9, one method 160 for randomly enabling a player to exchange termination units between variables begins upon a sequence triggering event, as indicated by the oval 162. The sequence triggering event again includes any event desired by the implementor, such as the generation of any award, a particular award or the generation of a particular number of awards such as after every three generations.

Upon a sequence triggering event, the game determines whether the player has acquired an appropriate amount of units to exchange, as indicated by the diamond 164. An exchange rate on the exchange selector 116 (FIGS. 5A through 5C) discloses how many termination units the player incurs on one variable to obtain a number of survival units on another variable. If the player does not have enough units to exchange or if exchanging units will terminate the game, the game preferably does not present the unit exchange option to the player and ends the sequence, as indicated by the oval 168.

If the player has an appropriate amount of units to exchange, the game generates a unit exchange option between two variables, such as between variable 1 and variable 2, a predetermined percentage of the time, such as 30%, as indicated by the block 166. The sequence ends for the variables 1 and 2, as indicated by the oval 168. The game includes performing method 160 for each available unit exchange between variables at any desired time. The game also includes enabling the option for any period of time while the player has the appropriate amount of units to exchange. The game performs the analysis of the method 160 for each unit exchange between two variables provided by the game.

Example of One Embodiment

Figure 10A:
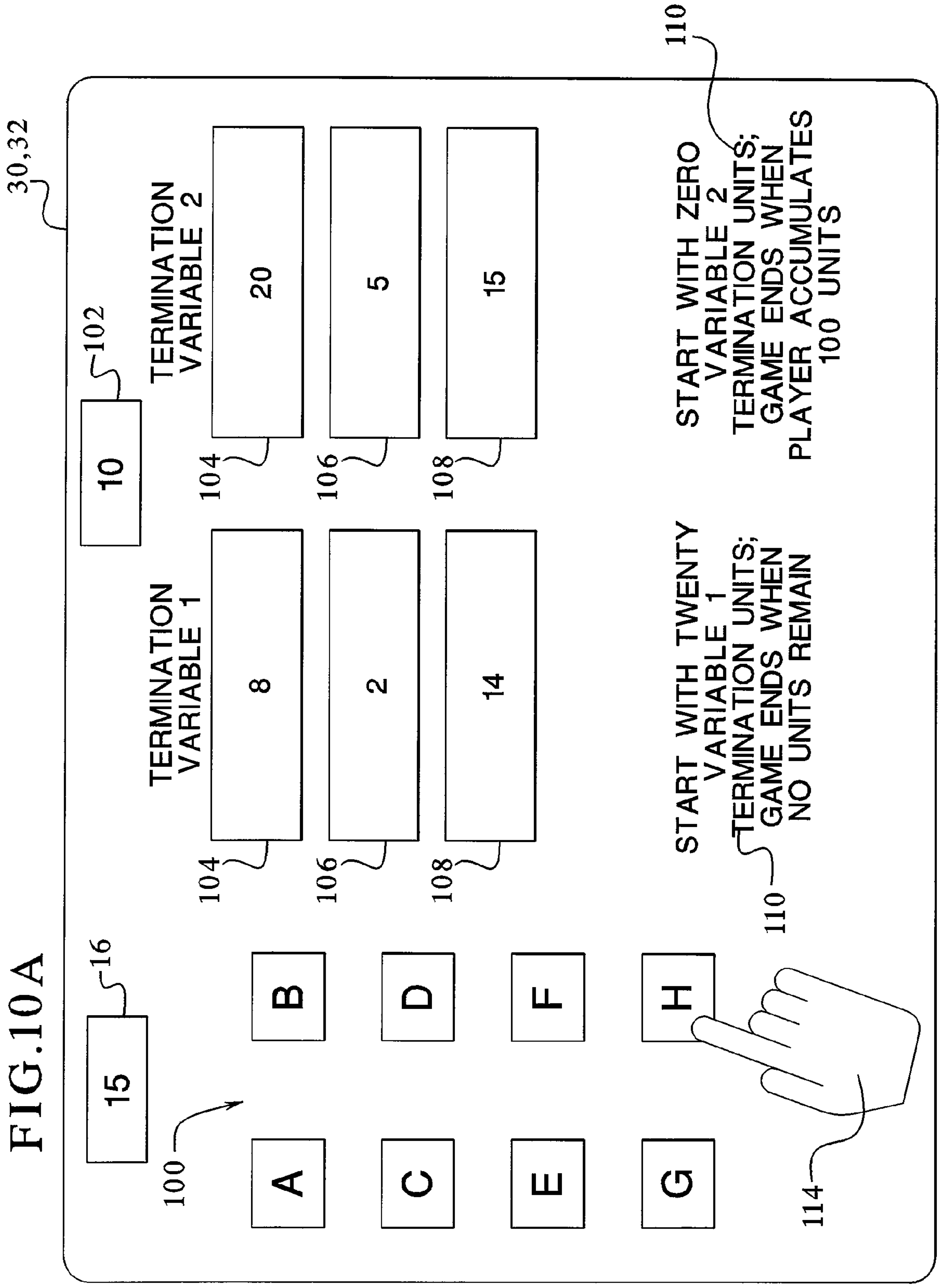
FIGS. 10A, 10B, 10C, 10D and 10E are front elevational views of one of the display devices of FIGS. 1A and 1B illustrating an example of a general embodiment of the present invention.

Referring now to FIGS. 10A through 10E, an example of one embodiment of the present invention is illustrated on one of the display devices 30 or 32. FIG. 10A illustrates that the player 114 selectively presses the "H" selector 100. The game generates a ten award as displayed in the paid display 102. The player has previously obtained five other awards, which the game displays in addition to the recent ten awards in the credit display 16. The game alternatively includes predetermining that the player starts the game at a certain point by generating the "H" selector 100. For example, in a bonus game embodiment, wherein the base game is a slot machine, a particular symbol or symbol combination on the reels 34 automatically generates the "H" selector 100 for the player as the first bonus round pick.

For variable 1, the game randomly generates eight termination units as displayed in the termination unit indicator 104 and two survival units as displayed in the survival unit indicator 106 for a total of six termination units. Because variable 1 is a decreasing variable, the game subtracts the six units from the starting point, twenty, and displays the accumulated effect of fourteen remaining units in the accumulation indicator 108. It should be appreciated that each selection could have: (a) termination units for one variable; (b) termination units for multiple variables; (c) termination units for all variables; (d) survival units for one variable; (e) survival units for multiple variables; (f) survival units for all the variables; (g) any combination of termination units and survival units; or (h) no termination units or survival units.

For variable 2, the game randomly generates twenty termination units as displayed in the termination unit indicator 104 and five survival units as displayed in the survival unit indicator 106 for a total of fifteen termination units. Because variable 2 is an increasing variable, the game adds the fifteen units from the starting point, zero, and displays the accumulated effect of fifteen units in the accumulation indicator 108.

Figure 10B:
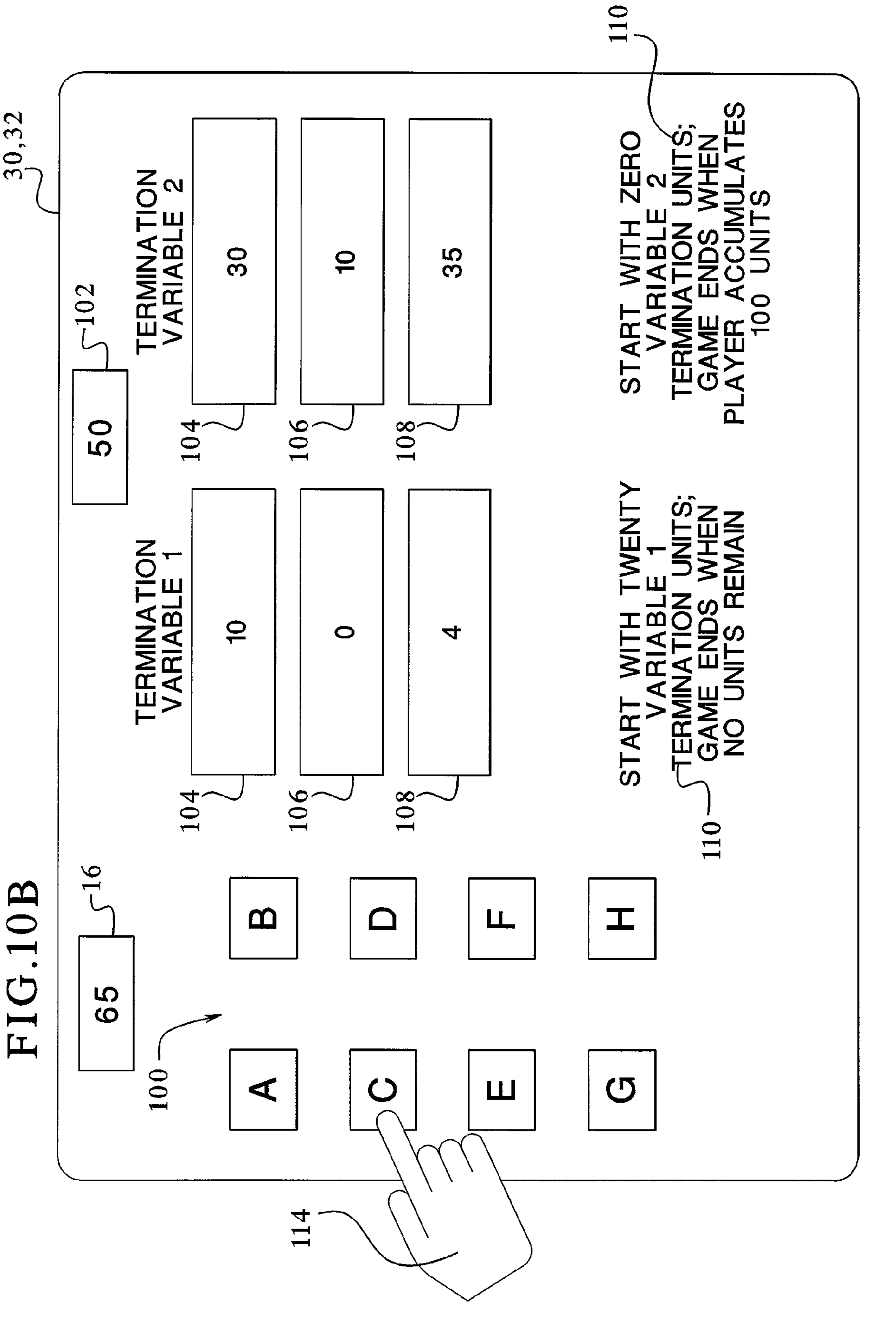

FIG. 10B illustrates that the player 114 selects the "C" selector 100. The game generates a fifty award and adds it to the player's total. For variable 1, the game nets ten termination units, such that the player has only four left. For variable 2, the game nets twenty termination units, whereby variable 2 has only generated 35 of the 100 necessary for termination.

Figure 10C:
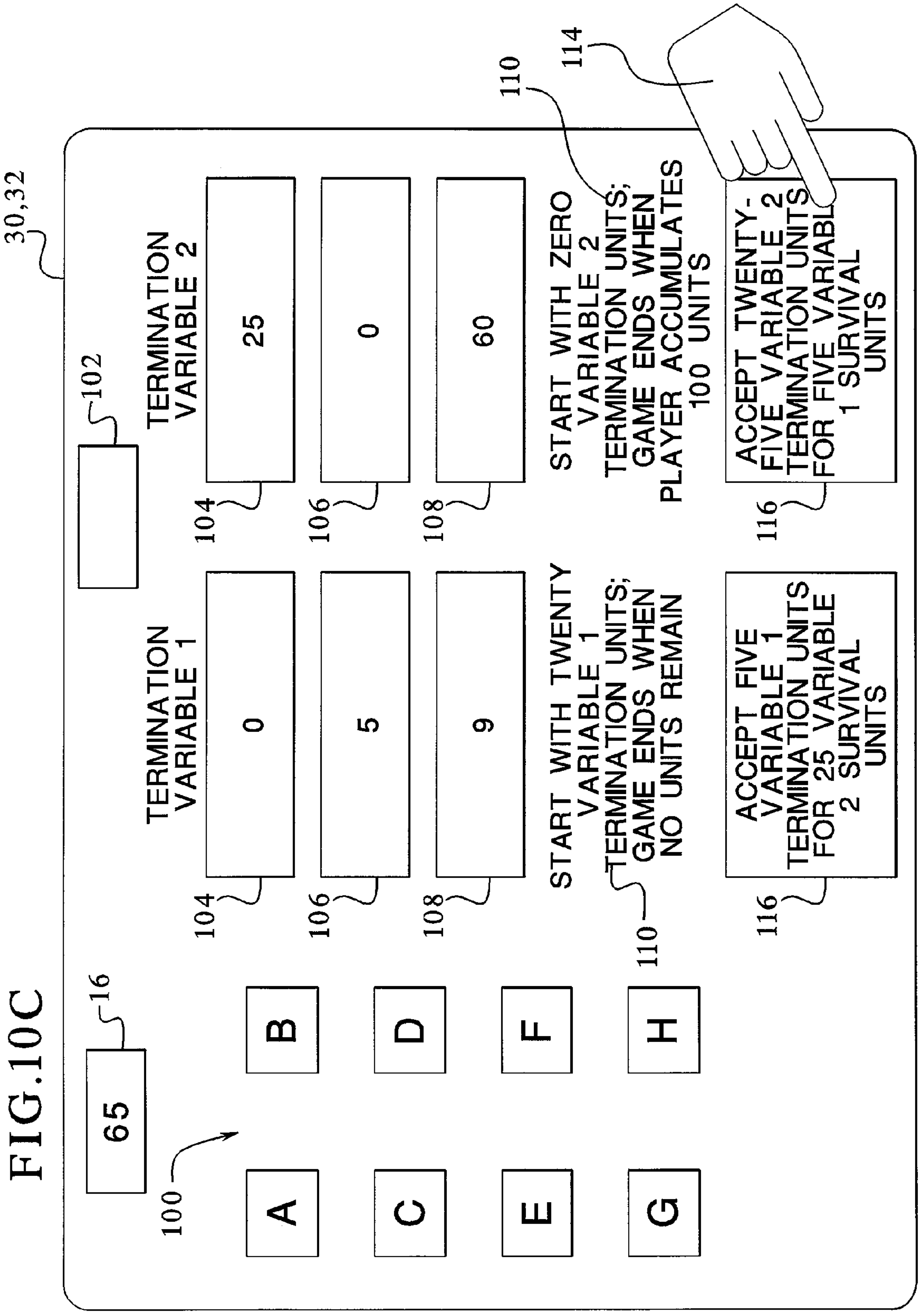

In FIG. 10C, the game has provided a unit exchange option between variables 1 and 2. Since variable 1 is close to terminating the game, the player 114 opts to shift termination units to variable 2 by selecting the unit exchange selector 116 for variable 2. The exchange adds twenty-five termination units to variable 2 and adds five survival units to the player's variable 1 accumulation (adding benefits to the player for a decreasing variable), such that the player now has room to accrue nine variable 1 termination units. It should be appreciated that the variable exchange has no effect on the player's awards.

Figure 10D:
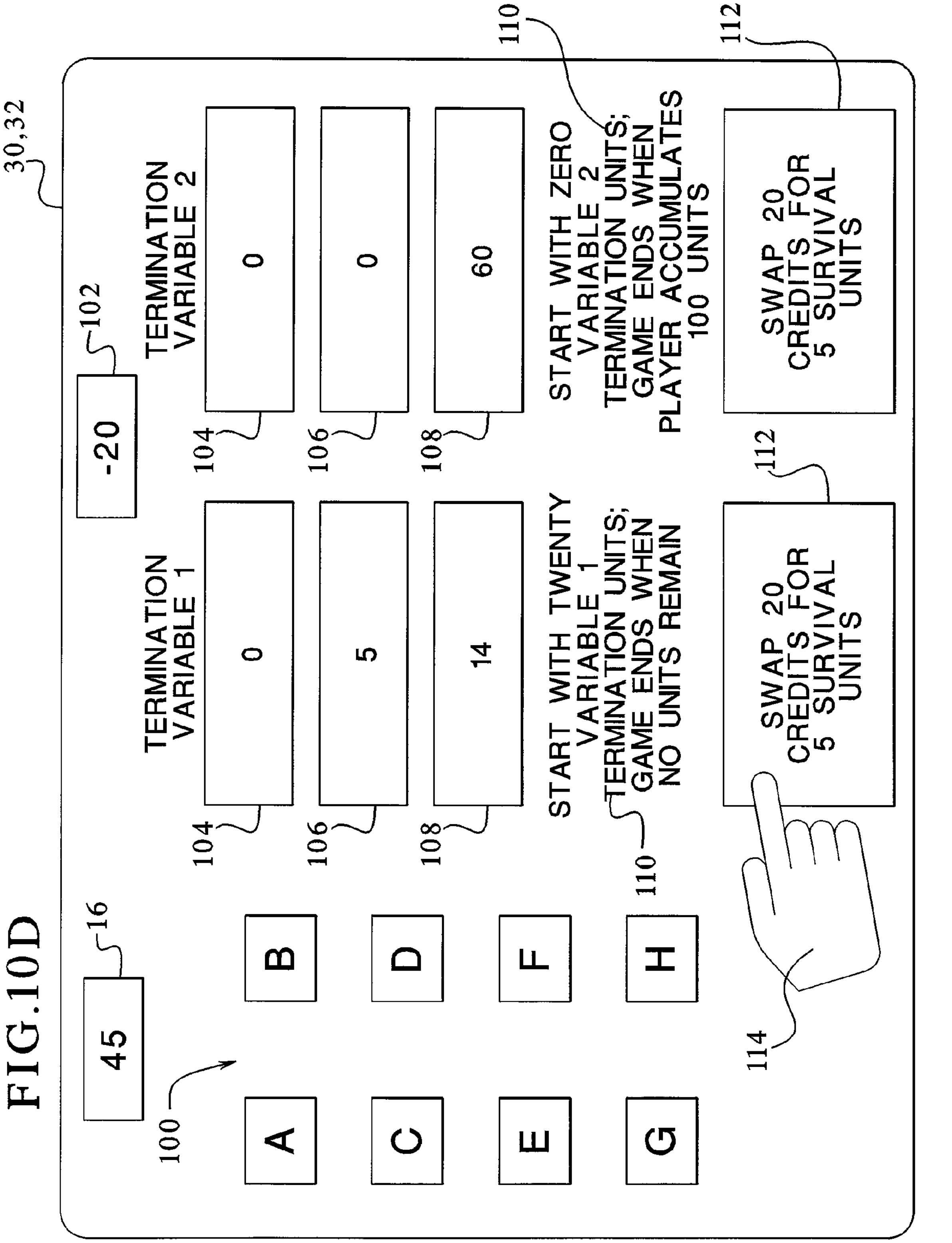

In FIG. 10D, the game has provided an award exchange option, whereby the player gives up twenty awards for five survival units. The player does not feel comfortable with the status of variable 1 and opts to give up twenty awards by selecting the award exchange selector 112 for variable 1. The exchange subtracts twenty awards from the credit display 16 and alternatively shows a negative twenty awards in the paid display 102. If the game alternatively accrues bonus awards in the paid display, the game then requires the player to have at least the debit amount in the paid display 102 to execute an award exchange. The game adds another five survival units to variable 1, giving the player room to accrue fourteen variable 1 termination units.

Figure 10E:
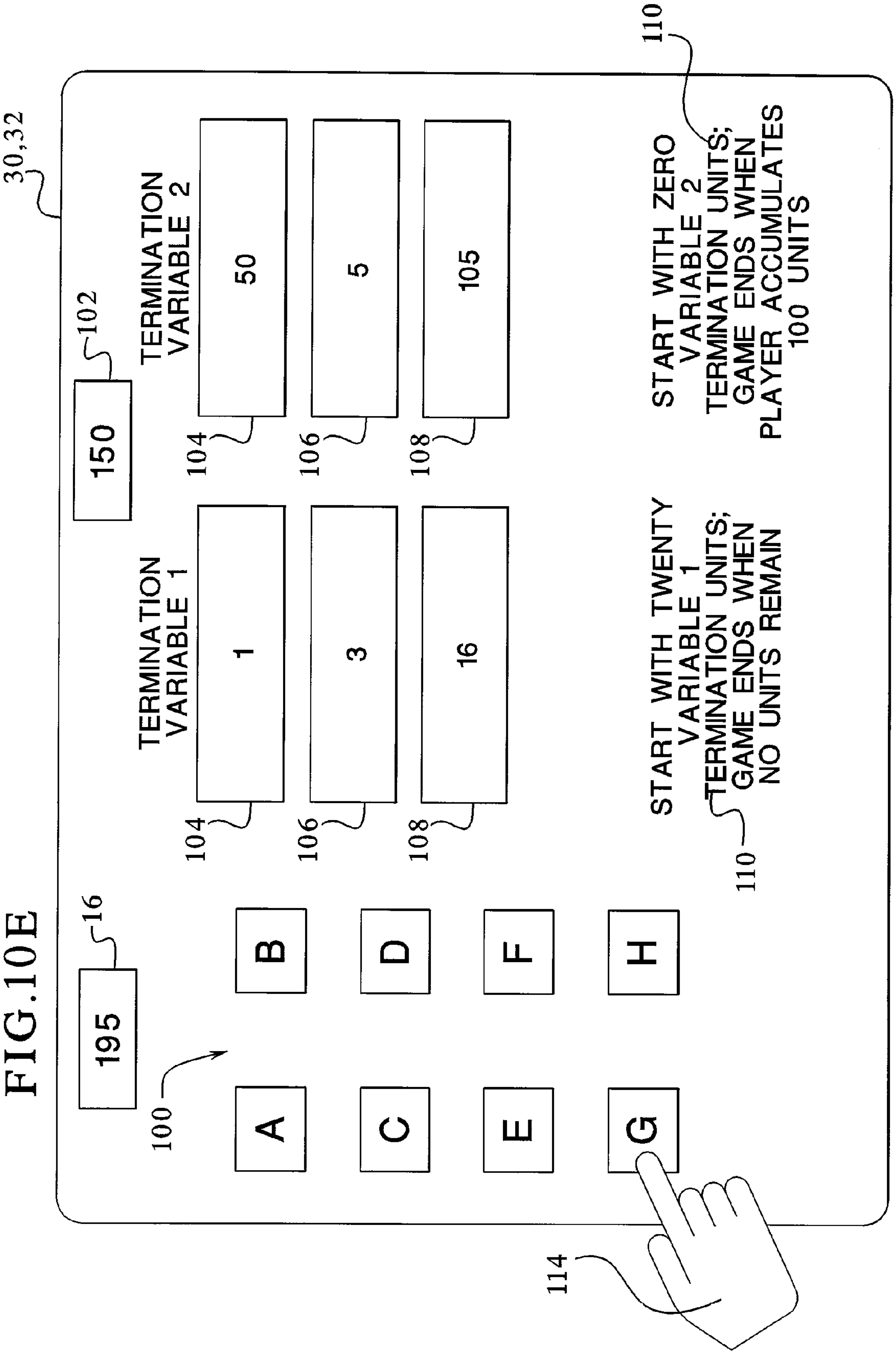

FIG. 10E illustrates that the player 114 selects the "G" selector 100. The game generates a 150 award and adds it to the player's total. For variable 1, the game accumulates two survival units, which is possible in a given database structure, such that the player is in a safer position after the selection and now has a sixteen termination unit buffer. For variable 2, however, the game accumulates forty-five more termination units, which puts the total in the accumulation indicator 108 for variable 2 over the termination limit of 100 and thereby terminates the game. As illustrated, the game in this example provides the 150 award even though a termination limit has been reached. The game alternatively does not provide an award upon the generation of a termination limit.

Games Having Related Selectors

As previously described, the present invention includes enabling the player to select any selector 100 in any order, and includes enabling or not enabling the player to select the same selector 100 more than once. The present invention also contemplates: (i) grouping selectors, such that the game enables the player to pick one or more, but not all selectors of a group; (ii) ordering the selectors, such that the game requires the player to pick the selectors in a predetermined order; and (iii) grouping and ordering the selectors, such that the game requires the player to pick one, a plurality of or all the selectors of a group in a predetermined order. In any of these embodiments, the present invention further contemplates including one or more jackpots or large prizes associated with particular selectors 100 or as a result of a predetermined event, such as successfully picking all the selectors.

Figure 11:
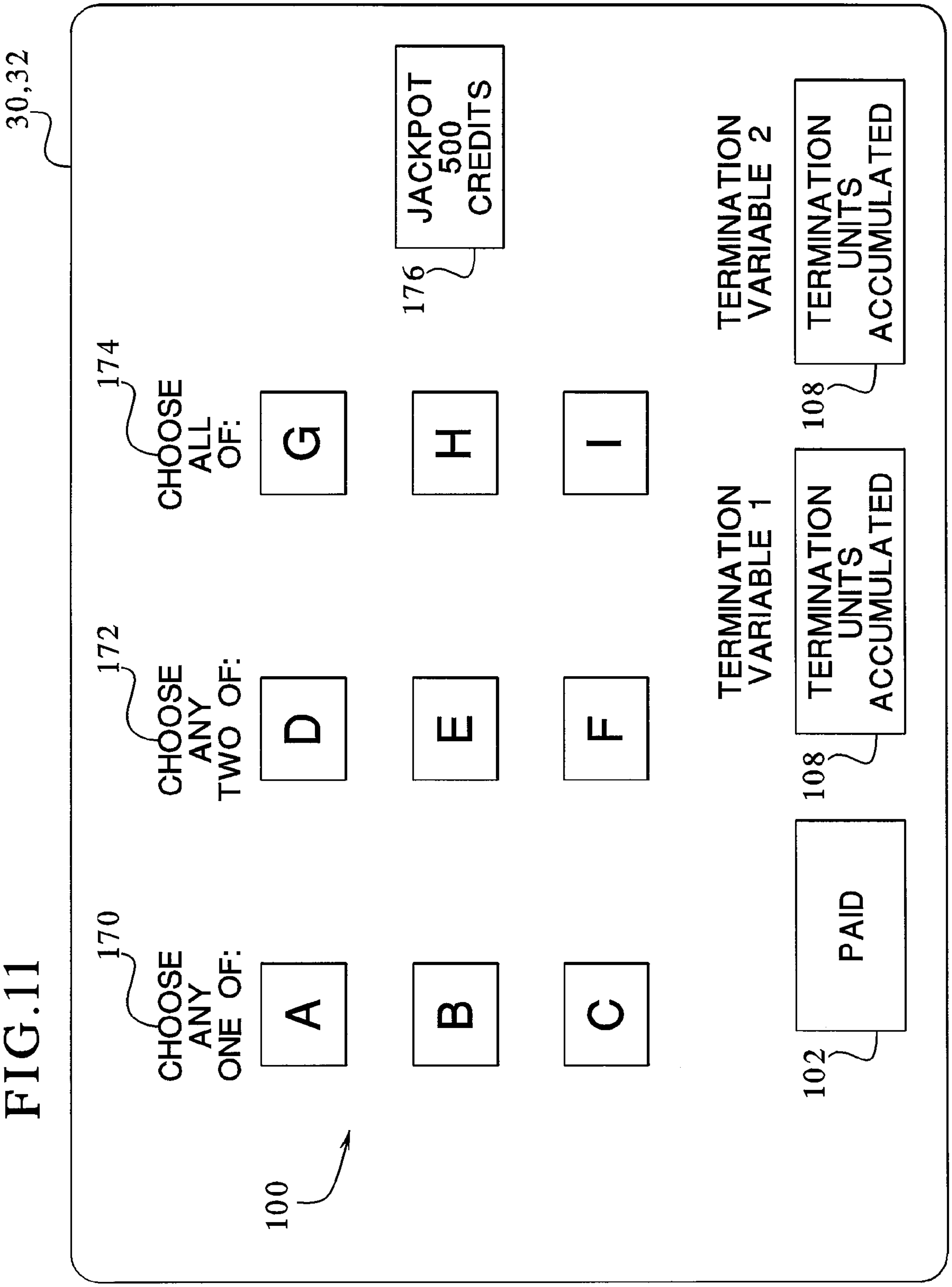
FIG. 11 is a front elevational view of one of the display devices of FIGS. 1A and 1B illustrating one related selector embodiment of the present invention, which includes a plurality of selector groups.

Referring now to FIG. 11, one related selector embodiment of the present invention includes a display on a display device 30 or 32 having a plurality of selectors 100, the paid display 102 and accumulation indicators 108 for a plurality of termination variables and a plurality of selector groups 170, 172 and 174. The selector groups preferably include a visual, audio or audiovisual message directing the player to pick one or more of the selectors of the group. FIG. 11 alternatively includes a single visual, audio or audiovisual message directing the player to pick one or more of the selectors from the different groups.

The selector group 170 enables the player to pick any one of the selectors "A" through "C." That is, after the player selects for example "B," the player cannot thereafter select "A" or "C." The selector group 172 enables the player to pick any two of the selectors "D" through "F." The selector group 174 enables the player to pick any and all of the selectors "G" through "I." In FIG. 11, the game enables the player to select up to six (1+2+3) selectors. The present invention includes predetermining a starting point for the game such as predetermining a particular group or predetermining a particular selector 100.

FIG. 11 also includes a jackpot award 176, displayed here as 500 credits. The jackpot award includes any of the award types described above and any amount, preferably a relatively large amount, desired by the implementor. The present invention contemplates providing the jackpot award 176 after the player successfully picks all six of the enabled selectors from the groups 170, 172 and 174, in which case the game preferably L automatically provides the jackpot award 176 after the picks, without further player input. The jackpot 176 provides an incentive for the player to keep the game going by exchanging termination units between variables, as illustrated in FIG. 10C, and by exchanging awards for survival units, as illustrated in FIG. 10D.

The present invention also contemplates enabling the jackpot award at some intermediate point in the picking process such as after completing a certain number of picks or after completing one or more of the selector groups 170, 172 and 174, in which case the game preferably requires a player input or pick of the jackpot award 176 to receive the jackpot award. The game preferably terminates upon the player's jackpot pick. The object, in this jackpot embodiment, is to obtain as many awards from the selectors as possible, while ensuring an opportunity to pick and receive the jackpot award 176.

In one embodiment, the pick of a single selector 100 itself provides the jackpot award 176 or, alternatively, instantaneously completes any requirements for the jackpot award 176. This selector 100, which either singly or through completion of a condition provides the jackpot 176 to the player, may be undesirable to a player with an ample number of termination units 130 yet to acquire before termination. On the other hand, the jackpot activating selector 100 is likely welcomed by the player who is on the brink of termination.

Figure 12A:
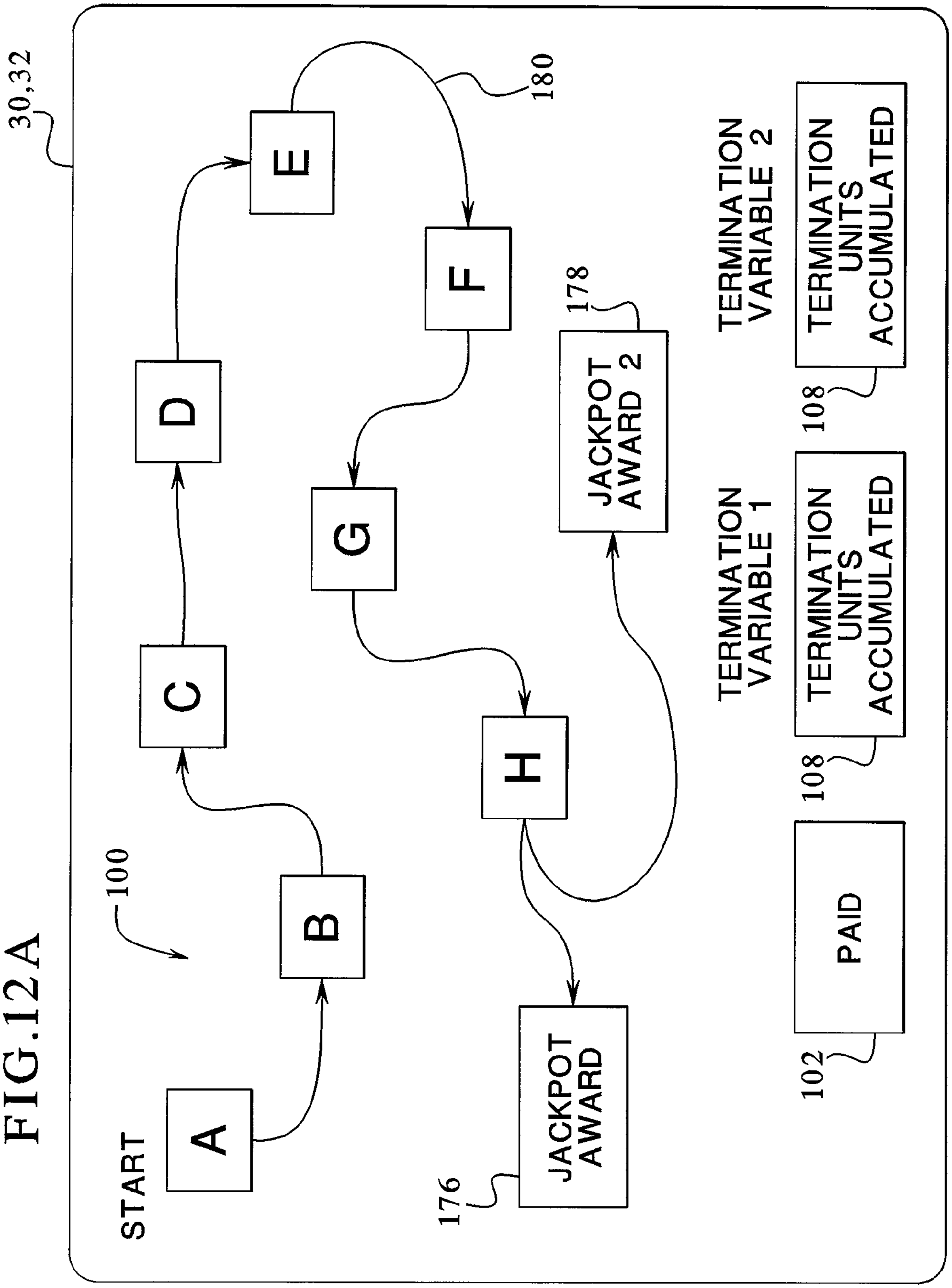
FIG. 12A is a front elevational view of one of the display devices of FIGS. 1A and 1B illustrating another related selector embodiment of the present invention, which includes a predetermined pick order or path.

Referring now to FIG. 12A, another related selector embodiment of the present invention includes a display on a display device 30 or 32 having the paid display 102, accumulation indicators 108 for a plurality of termination variables, a plurality of jackpots 176 and 178 and a plurality of selectors 100 having a predetermined picking order or path 180. The path 180 preferably includes a visual, audio or audiovisual message directing the player to: (i) a starting pick; and (ii) to each successive pick. In certain instances, described below, the game alternatively enables the player to pick a starting point along the predetermined pick order or path 180.

The player picks in order "A," "B," "C," etc., such that whether the game randomly assigns awards to the selectors 100 or to the picks of an order, as described above in connection with FIG. 6A, makes no difference in the game outcome. At the end of the path 180, the game includes providing one or more jackpot awards 176 and 178. If the game provides only one jackpot award 176, at the end of the path, the game preferably automatically provides the jackpot award after the picks along the path, without further player input. If the game provides a plurality of jackpot awards 176 and 178, or enables a single jackpot to be selected at any time, the game preferably requires the player to pick a jackpot award. The player preferably receives only the selected jackpot award, and the game preferably reveals any unselected jackpot awards.

When the jackpots 176 and 178 are at the end of the path 180, they provide an incentive for the player to keep the game going by exchanging termination units between variables, as illustrated in FIG. 10C, and by exchanging awards for survival units, as illustrated in FIG. 10D. The game alternatively enables the jackpot award at some intermediate point in the picking process such as at any time or after completing a predetermined number of picks along the path 180. In this alternative, the present invention contemplates enabling the player to pick a starting point along the path 180. The game preferably terminates upon the player's jackpot pick. The object again is to obtain as many awards along the path 180 as possible, while ensuring an opportunity to pick and receive a jackpot award 176 or 178.

Figure 12B:
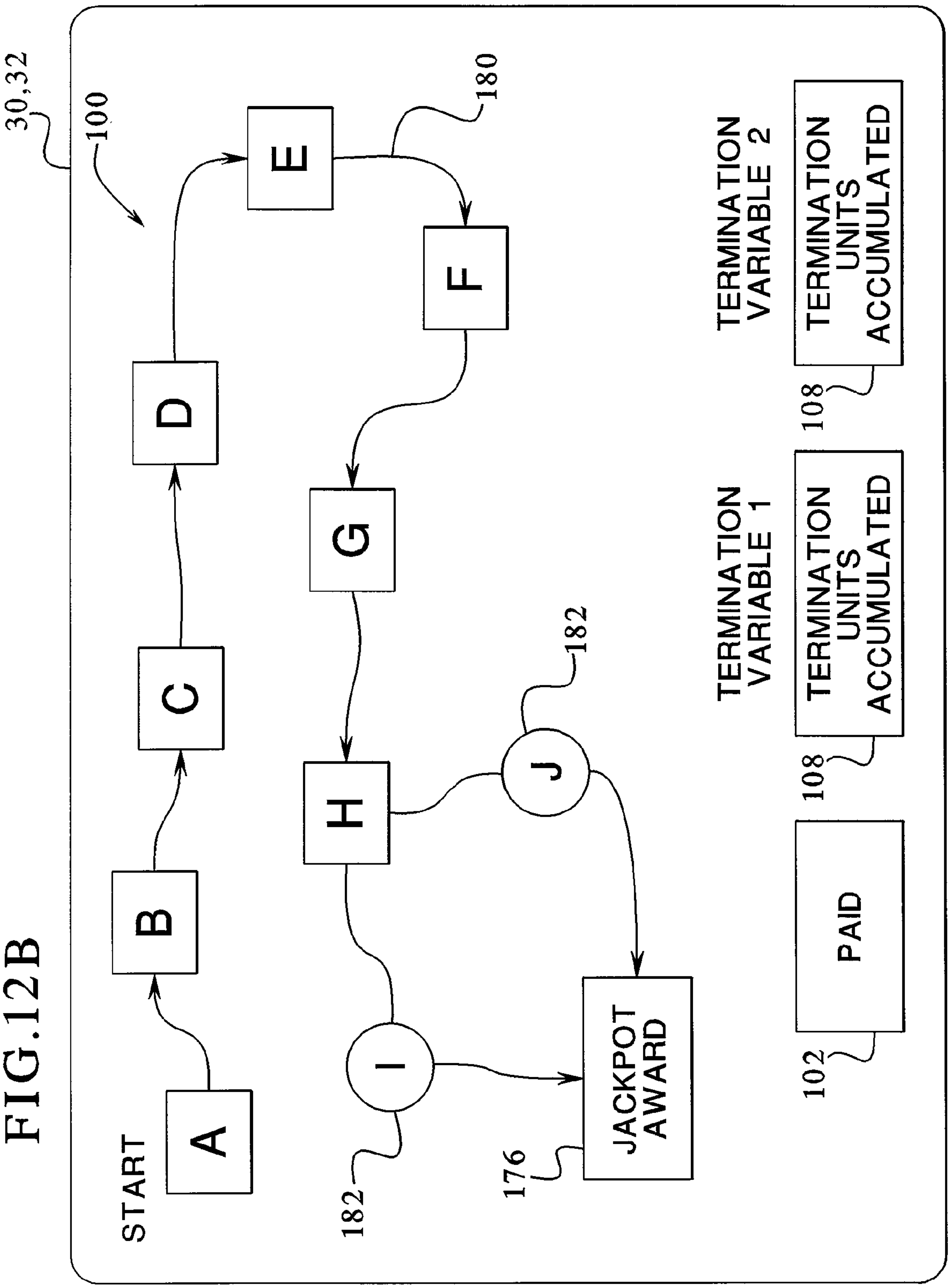
FIG. 12B is a front elevational view of one of the display devices of FIGS. 1A and 1B illustrating a further related selector embodiment of the present invention, which includes a final jackpot award and multiple selectable paths thereto.

FIG. 12B illustrates a variation on the embodiment of 12A and includes the paid display 102, the accumulation indicators 108, a single jackpot award 176, a plurality of selectors 100 having a predetermined picking order or path 180 and a plurality of player selectable paths 182 between the final selector "H" and the jackpot award 176. In this embodiment, if the player survives the pick of the "H" selector, the player must pick either path "I" or path "J" to obtain the jackpot award 176.

As discussed above with respect to FIG. 10E, upon a player pick and a random generation of a number of units leading to a total meeting or surpassing of the termination limit of termination units, the present invention includes not providing an award for the pick. The embodiment of FIG. 12B therefore includes a game, wherein the player is forced to decide between two selectable paths 182, one of which may lead to a jackpot award and one of which may not. In this embodiment, if the player successfully picks a path 182, the game preferably automatically awards the jackpot award 176, without any further player input.

Figure 12C:
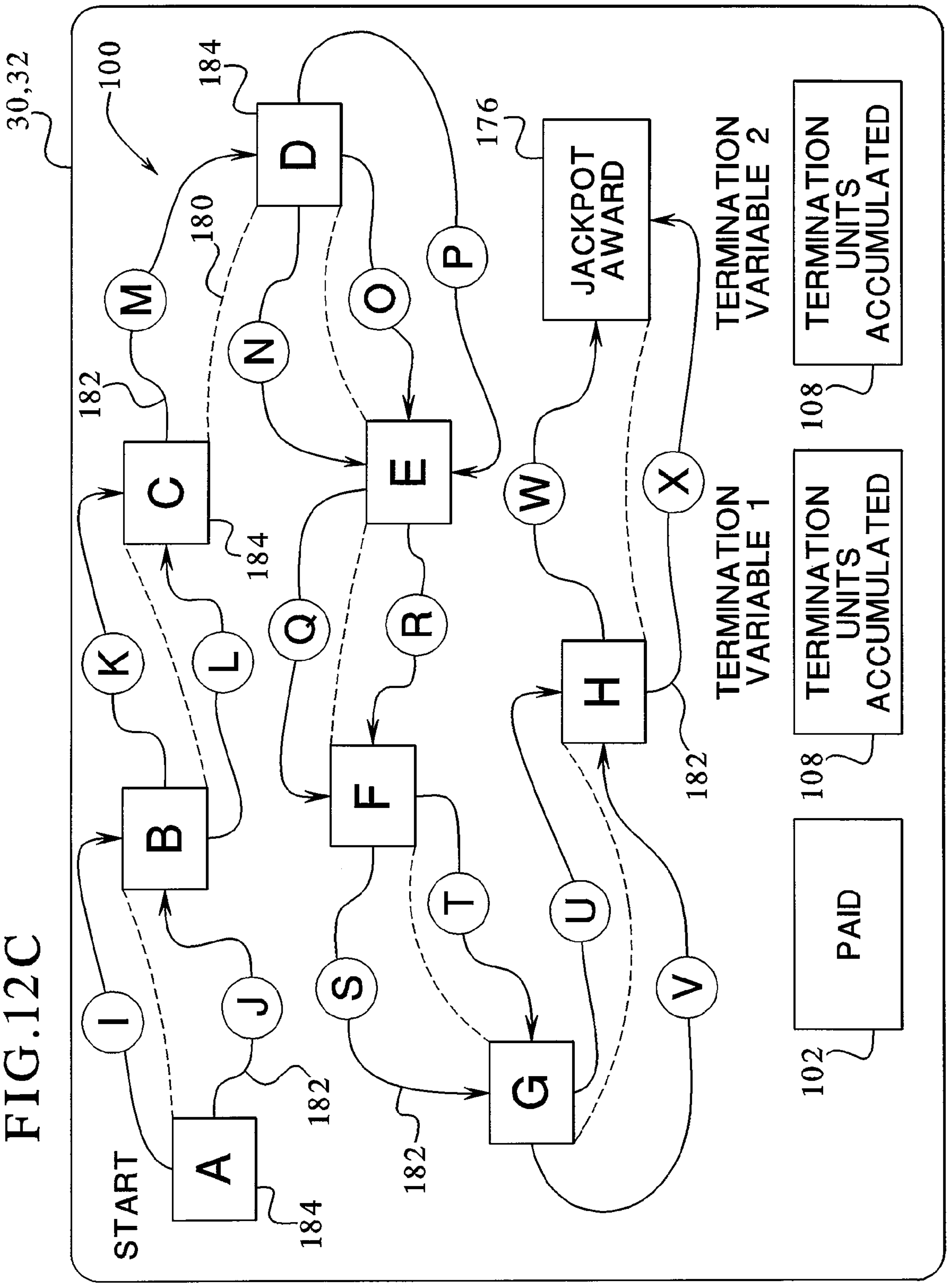
FIG. 12C is a front elevational view of one of the display devices of FIGS. 1A and 1B illustrating yet another related selector embodiment of the present invention, which includes a plurality of indicators and multiple selectable paths between the indicators.

FIG. 12C illustrates a variation on the embodiment of 12B and includes the paid display 102, the accumulation indicators 108, a single jackpot award 176, a plurality of indicators 184, "A" through "H," defining a predetermined picking order or path 180 (indicated by the dashed line), and a plurality of player selectable paths 182 between the selectors and between the final selector "H" and the jackpot award 176. In this embodiment, the player advances towards an indicator 184 by picking one of a plurality of selectable paths 182. The embodiment includes providing any number of selectable paths 182 between any two indicators 184. For instance, the game provides two paths between the indicators "A" and "B," whereby the player picks either the "I" path or the "J" path. The game provides only one path, the "M" path between the indicators "C" and "D." The game provides three paths between the indicators "D" and "E," whereby the player picks either the "N" path, the "O" path or the "P" path.

In the embodiment of FIG. 12C, the game preferably assigns an award to a particular indicator 184 or pick of a pick order as described above in connection with FIG. 6A. The game assigns the termination units and survival units, however, to the selectable paths 182. Different paths produce different accrued termination units for the termination variables. One set of paths picked by the player might provide an easy road to the jackpot award 176, while another set may dead end quickly. The game alternatively assigns awards to a particular selectable path 182, such that different paths 182 produce different awards. In an alternative embodiment, the result is randomly determined and the selection of the paths by the player does not change the end result.

Figure 13:
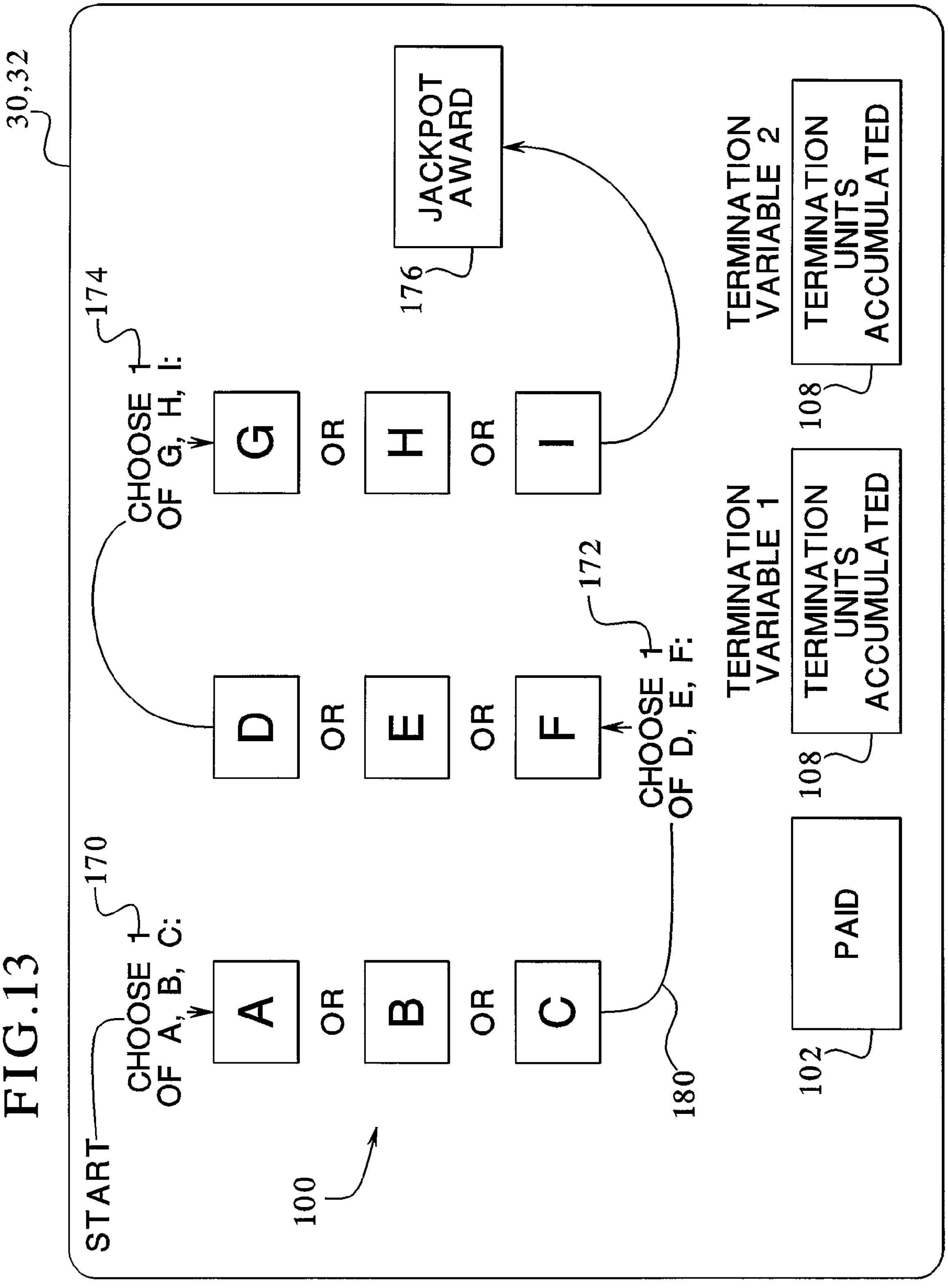
FIG. 13 is a front elevational view of one of the display devices of FIGS. 1A and 1B illustrating yet a further related selector embodiment of the present invention that includes a plurality of selector groups and a predetermined pick order or path between the groups.

Referring now to FIG. 13, a further related selector embodiment of the present invention includes a display on a display device 30 or 32 having the paid display 102, the accumulation indicators 108, a jackpot 176, a plurality of selectors 100, a plurality of selector groups 170, 172 and 174 and a predetermined picking order or path 180 between the different groups. The embodiment of FIG. 13 is a hybrid of the embodiment of FIG. 11 and the embodiments of FIGS. 12A through 12C.

The game enables the player to pick any one of the selectors "A," "B," or "C" then any one of the selectors "D," "E," or "F" then any one of "G," "H," or "I." As disclosed above in FIG. 11, the groups 170 through 174 include enabling a player to pick one, a plurality or all of the picks of a group. The embodiment includes providing a plurality of selectable jackpot awards at the end of the path 180 or enabling the player to select the jackpot 176 at any time and terminate the game. The embodiment further includes providing selectable paths (not illustrated) between the selector groups 170, 172 and 174 and from the final selector group 174 to the jackpot award 176.

In any of the embodiments discussed in connection with FIGS. 10A through 10E, FIG. 11, FIGS. 12A through 12C and FIG. 13, the game may completely or nearly completely reset one or more or all of the termination variables. This is accomplished in one embodiment by placing one or more survival unit 132 entries into the unit tables of FIGS. 7A through 7E that match or nearly match the termination limit. If the player generates more survival units 132 than there are termination units 130 to offset, the game can maintain a zero or negative balance. In another embodiment, a reset entry is placed in the unit tables, which sets the termination units 130 to their initial setting.

Detours

In the unrelated selector embodiment illustrated by FIGS. 10A through 10E and in any of the related selector embodiments of FIGS. 11, 12A through 12C and 13, the present invention contemplates providing detours. A detour is a game event that is preferably randomly generated, wherein the game, via a visual, audio or audiovisual display, directs the player to make a preferably single pick of either a particular selector 100, selectable path 182 or from a particular selector group (e.g., groups 170, 172 or 174). The game makes the direction either: (i) where no direction, path or grouping exists; (ii) in contradiction to an established group limitation; or (iii) in contradiction to an established path.

The game preferably presents a detour directly after a player's pick. For example, in FIGS. 10A through 10E, if the player picks the "B" selector, the game includes randomly generating a visual, audio or audiovisual message directing the player to pick another selector 100 or more specifically to pick, e.g., the selector "C." In FIG. 11 or 13, if the player picks the "F" selector of the group 172, the game includes randomly directing the player to pick another selector 100 of the same group 172 or from a different group 170 or 174, even if the player has exhausted the picks in the group. In FIG. 12A or 12B, if the player picks the selector "C," the game includes randomly directing the player to pick another selector 100 or more specifically to pick, e.g., the selector "G." In FIG. 12C, if the player picks the path "O," the game includes randomly directing the player to another path to the same indicator 184, another path to a different indicator 184 or more specifically to another path such as path "R."

Figure 14:
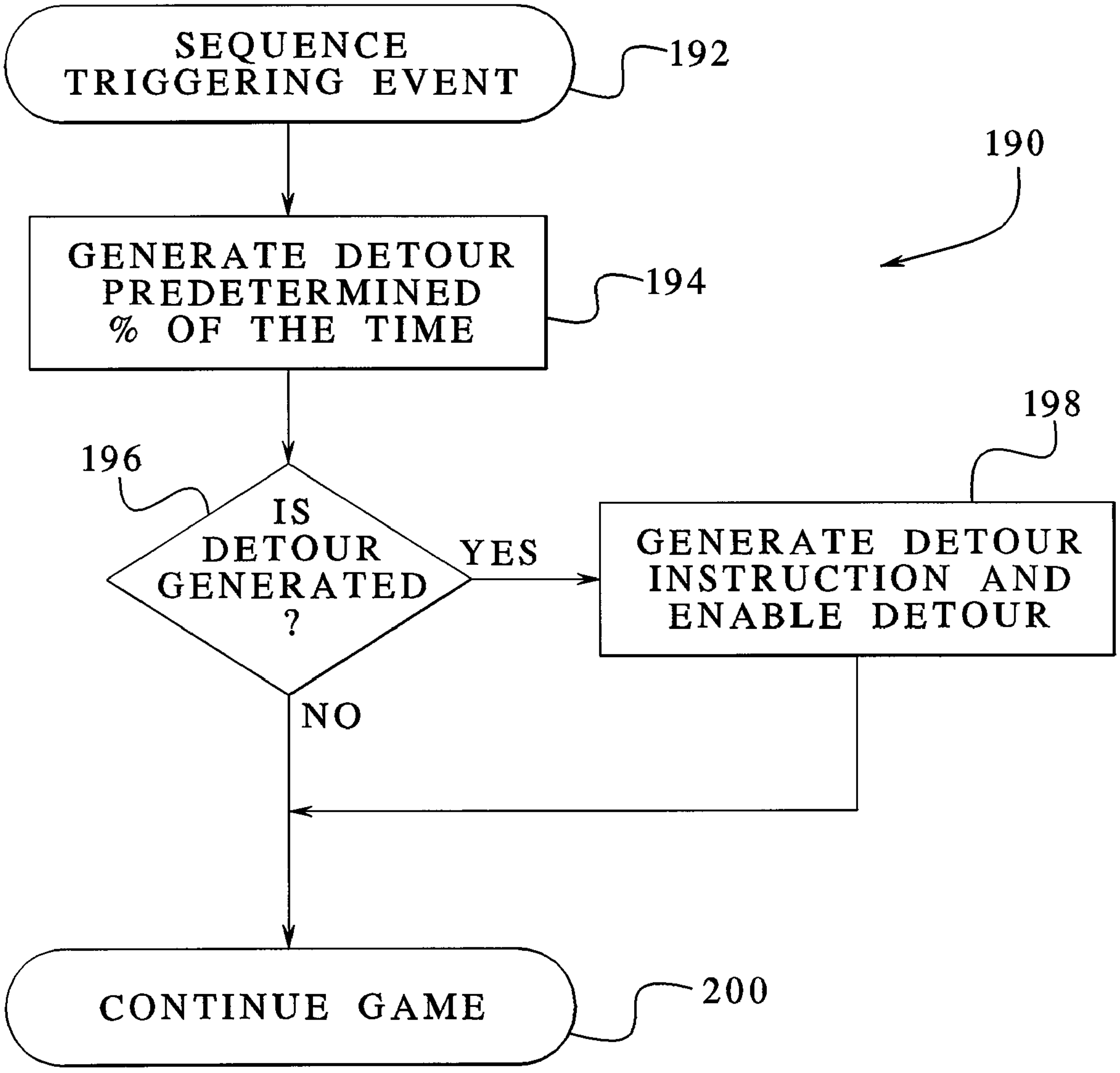
FIG. 14 is schematic flow diagram illustrating one method for randomly generating a detour, wherein the game directs the player to make another selection.

Referring now to FIG. 14, one method 190 for randomly generating a detour begins upon a sequence triggering event, as indicated by the oval 192. One preferred sequence triggering event includes any player input, such as a pick of a selector 100 or a selectable path 182. A sequence triggering event otherwise includes any desired by the implementor, such as the generation of a particular award or a particular item stored in a termination unit or survival unit database.

The game generates a detour a predetermined percentage of the time, as indicated by the block 194. If the game generates a detour, as indicated by the diamond 196, the game generates a detour instruction for the player and enables one or more selections, as indicated by the block 198. As stated above, the detour includes enabling the player to select from one or more selectors 100 or from one or more selectable paths 182. After the player executes the detour or if the game does not generate a detour, the game continues, as indicated by the oval 200.

Games Having Masked Selectors

As previously described, the present invention includes: (i) embodiments enabling the player to pick any selector 100 in any order; or (ii) embodiments restricting the player to pick from a particular group, in a particular order or pick from particular groups in a particular order. In the unordered embodiments, the game provides a jackpot based on the number of picks or based on the accumulated values of the picks. In the ordered embodiments, the game provides a path or visual grouping that visually tells the player where to pick and how close the player is to obtaining a jackpot award 176. Upon completion of the path, the game generates the jackpot award 176.

Figure 15A:
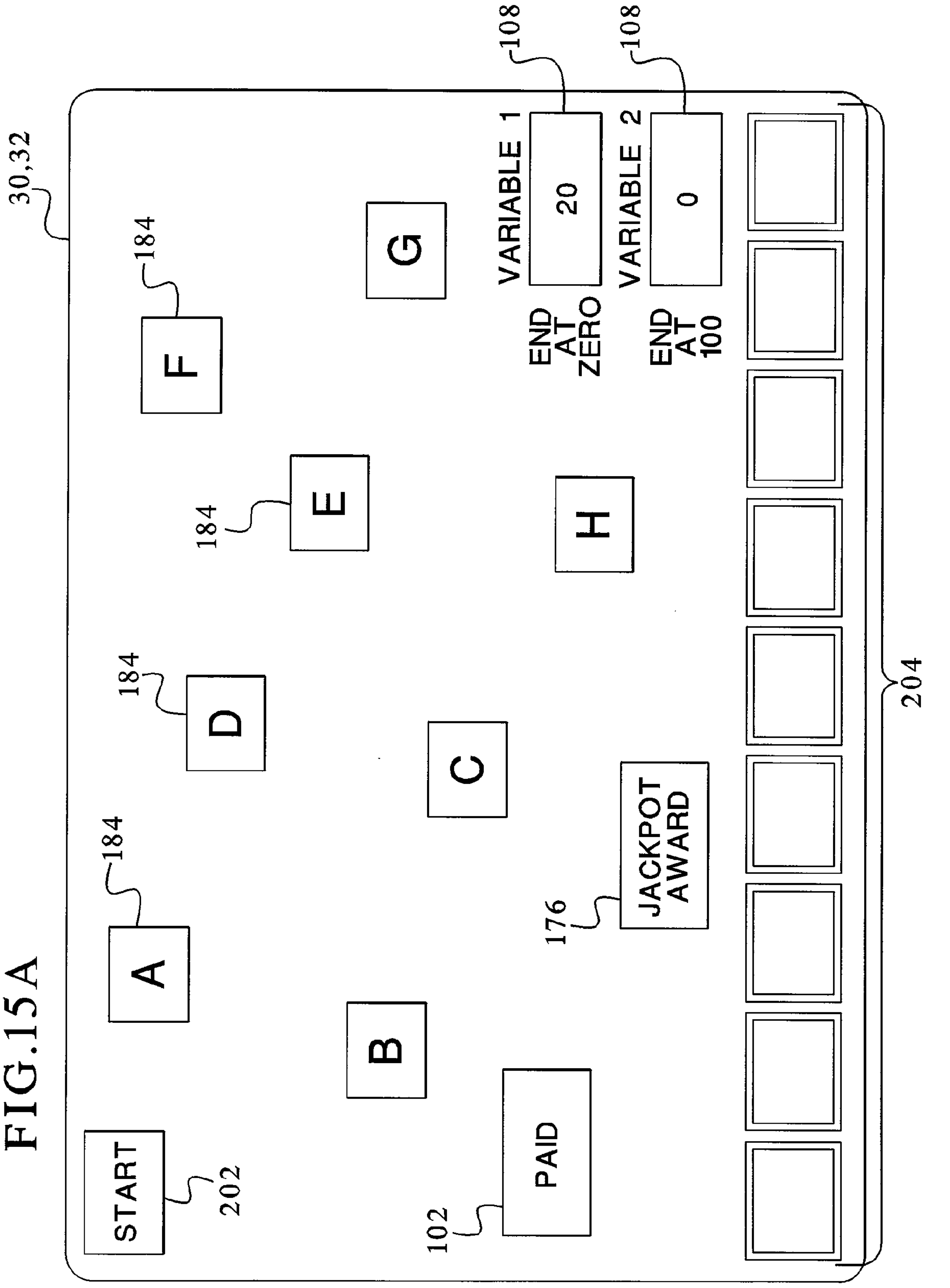
FIGS. 15A, 15B, 15C and 15D are front elevational views of one of the display devices of FIGS. 1A and 1B illustrating one example of a masked selector embodiment of the present invention.

The present invention further includes providing a third type of embodiment, wherein the player picks masked selectors, and wherein the game generates positions until generating the jackpot award or a termination limit. Referring now to FIG. 15A, one masked selector embodiment of the present invention includes a display on a display device 30 or 32 having a start position 202, a plurality of indicators 184, "A" through "H," the paid display 102, the accumulation indicators 108 for a plurality of termination variables and a plurality of masked selectors 204. The embodiment preferably includes a visual, audio or audiovisual message directing the player to pick one of the masked selectors 204.

Figure 15B:
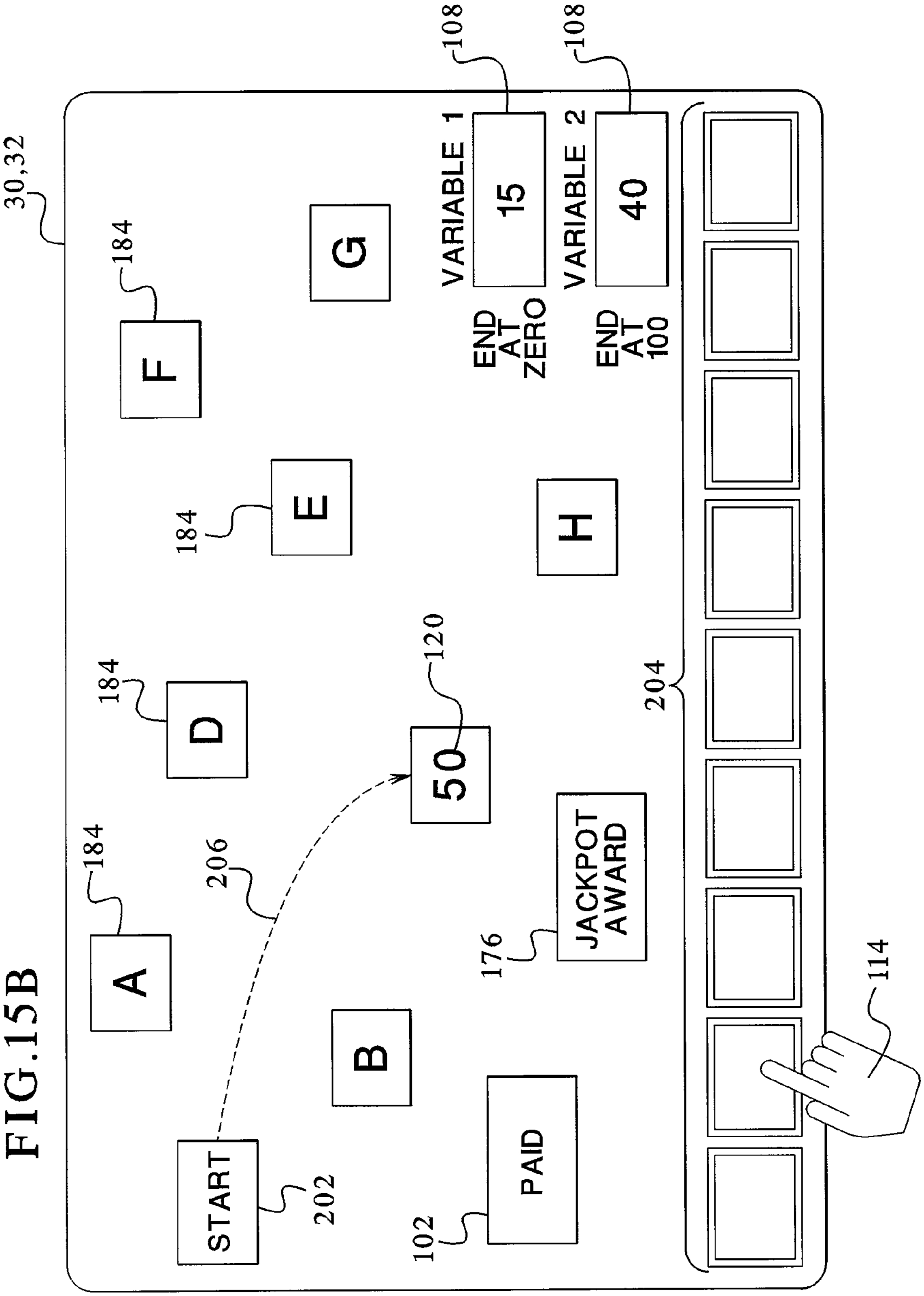

Referring now to FIG. 15B, when the player 114 picks one masked selector 204, the game preferably randomly generates one of the indicators 184, here the indicator "C" and an associated fifty award. The game assigns different indicators 184 to different masked selectors 204 or to picks of an order. The game assigns different awards to different masked selectors 204, to picks of an order or to different indicators 184. The display device 30 or 32 also illustrates a position move 206 from the start position 202 to the generated "C" indicator 184. In this embodiment and in any of the embodiments previously disclosed, the display device 30 or 32 is adaptable to display a position move by: (i) moving an object from one position to another; (ii) flashing colors or lights intermittently or sequentially between two positions; or (iii) leaving a trail between two positions.

The game also generates an accumulated number of termination and survival units for each termination variable as shown in the accumulation indicators 108. For ease of illustration, FIG. 15B only shows the accumulation of the termination and survival units in the accumulation indicators 108. As before, the game assigns different termination and survival units to different masked selectors 204, to picks of an order or to different indicators 184. As long as the accumulated or lost termination units do not meet or exceed the termination limit, the game enables the player to pick another masked selector 204.

Figure 15C:
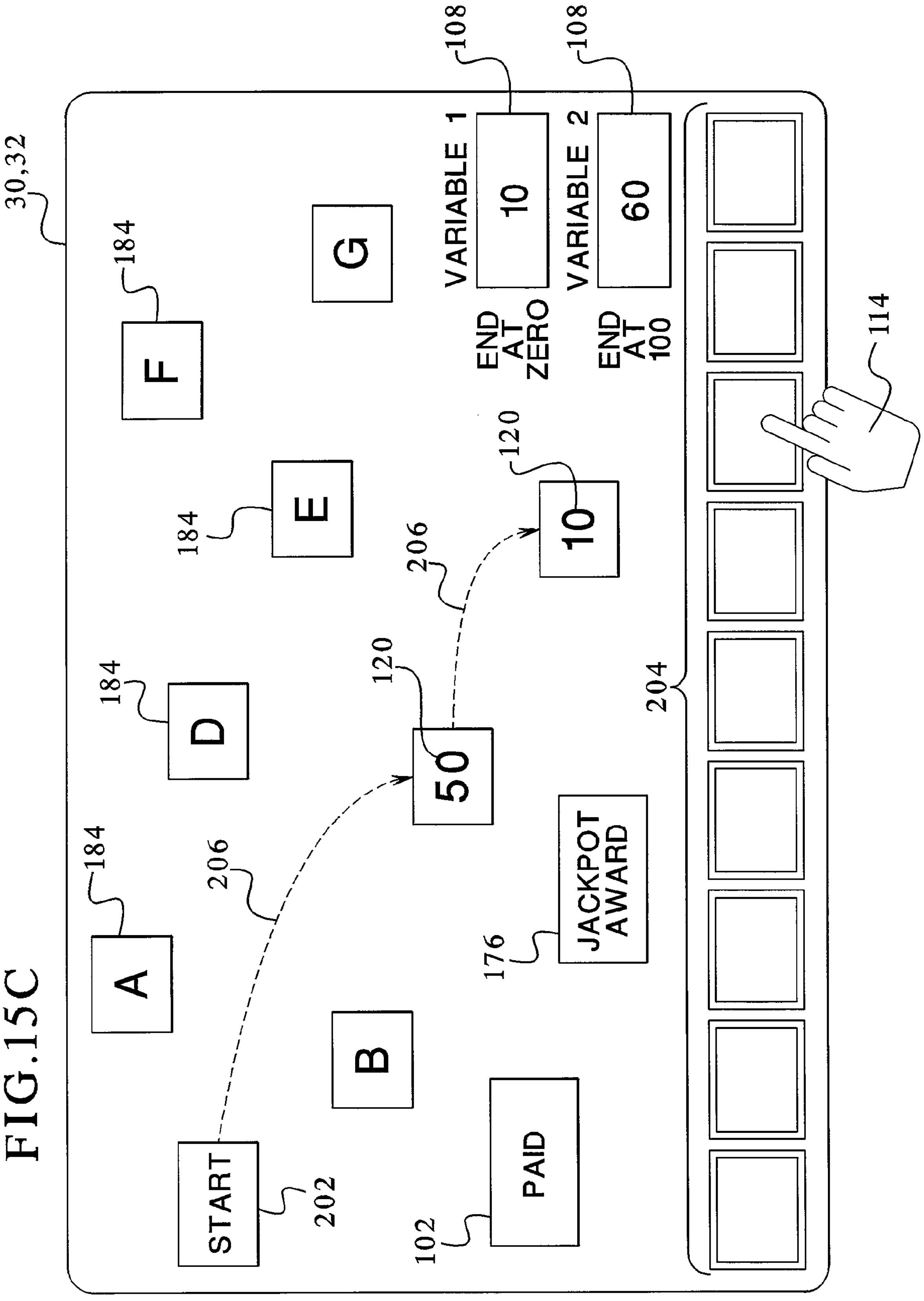

Referring now to FIG. 15C, when the player 114 picks a second masked selector 204, the game randomly generates another of the indicators 184, here the indicator "H," illustrates a position move 206 and generates the ten award. The game also accumulates termination and survival units for variables 1 and 2, as indicated by the accumulation indicators 108. The game preferably does not enable the player to pick the same masked selector 204 more than once, however, the game includes resetting each masked selector on each pick and thereby enabling the same pick twice. The current embodiment includes generating any indicator in any order.

Figure 15D:
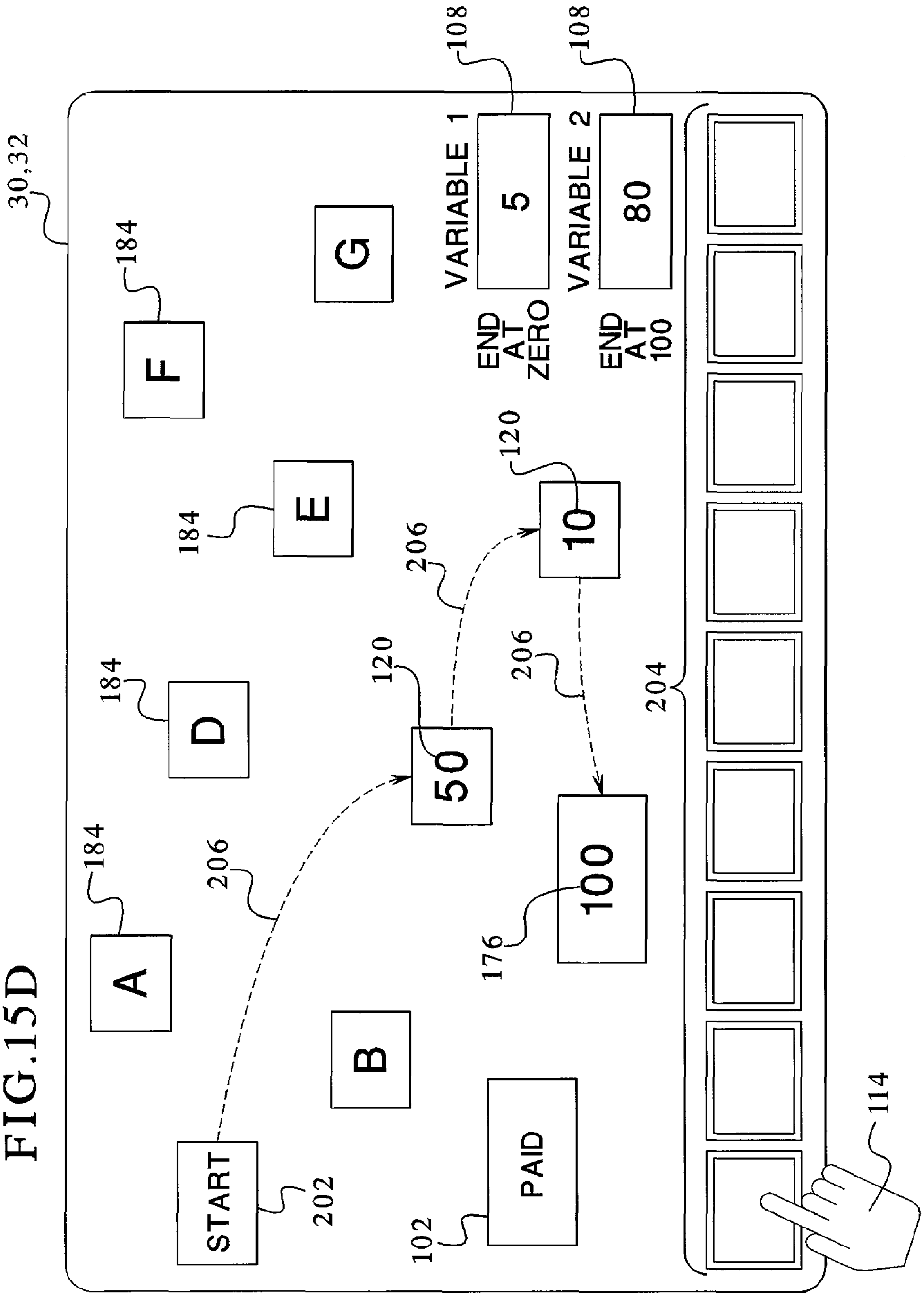

Referring now to FIG. 15D, when the player 114 picks a third masked selector 204, the game randomly generates the jackpot award 176 of one hundred. The game also updates the accumulation indicators 108. For any embodiment of the present invention, the game includes or alternatively does not include providing an award 120, including the jackpot award 176, when the accumulated or lost units meet or exceed the termination limit.

Figure 16:
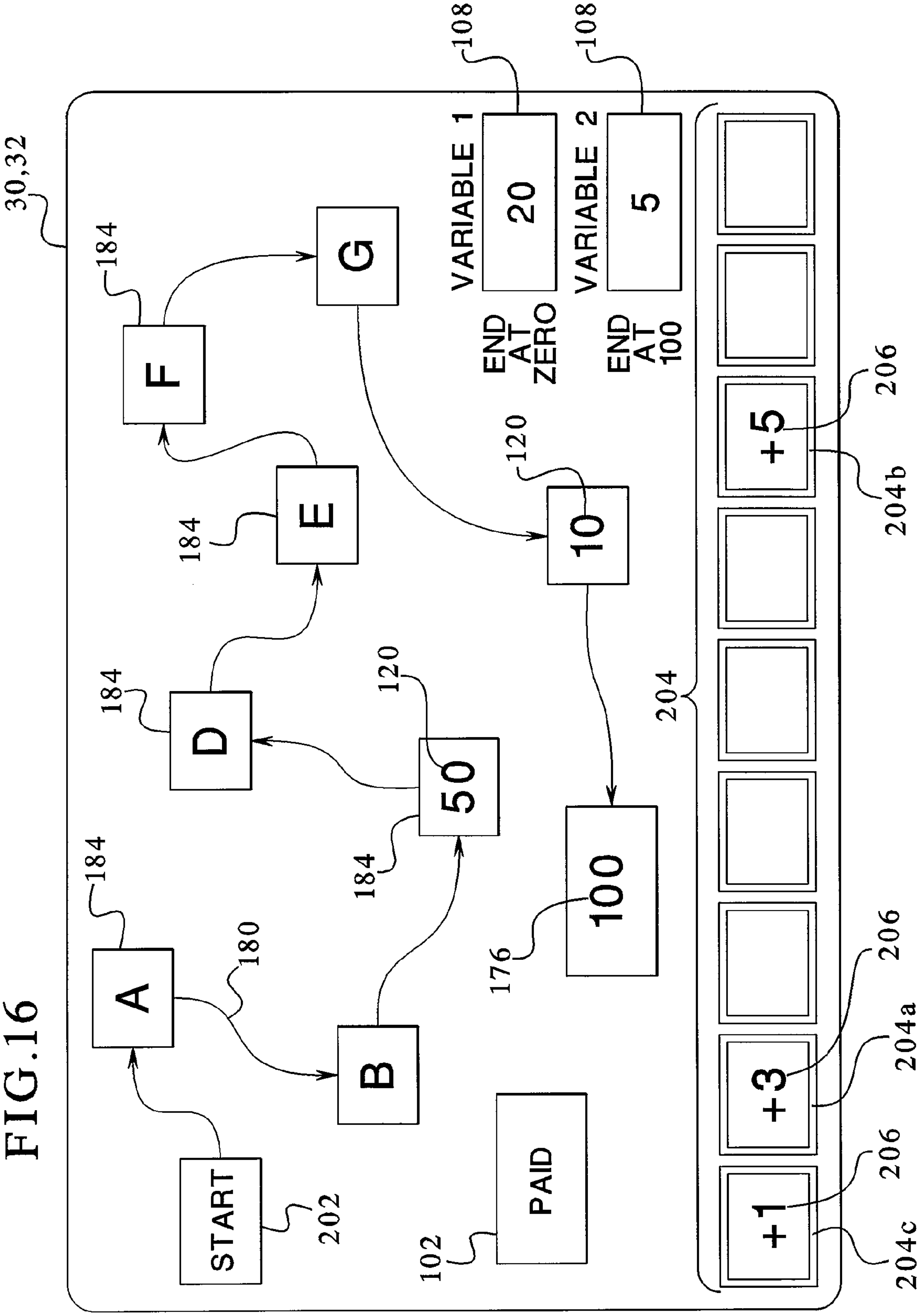
FIG. 16 is a front elevational view of one of the display devices of FIGS. 1A and 1B illustrating another example of a masked selector embodiment of the present invention.

Referring now to FIG. 16, an alternative masked selector embodiment of the present invention includes a display on a display device 30 or 32 having the start position 202, the indicators 184, "A" through "H," the paid display 102, the accumulation indicators 108 and the masked selectors 204. In this embodiment, when the player picks a masked selector, the game generates a positive or negative position move 206. In this example, when the player picks the masked selector 204*a*, the game generates a plus three position move 206 from the start position 202 to the "C" indicator 184 along the path 180. When the player picks the masked selector 204*b*, the game generates a plus five position move 206 from the "C" indicator 184 to the "H" indicator along the path 180. At the same time, the game generates awards 120 and termination units 108 as described above. The game proceeds in this manner until reaching the jackpot award 176 or accumulating a termination limit of units.

The alternative masked selector embodiment of FIG. 16 includes generating positive or negative position moves 206, wherein negative position moves 206 include generating or not generating new awards 120 for the player. As above, the game includes assigning different position moves 206 to different masked selectors 204 or to picks of an order. It should be appreciated that the position moves 206 generate new active positions on a particular indicator 184 and therefore the position moves 206 cannot be assigned to a particular indicator 184. It should further be appreciated, however, that generated awards 120, termination units and survival units can all be assigned to masked selectors 204, picks of an order or to the indicators 184.

Multiple Stages

As described above, in one embodiment, the game ends when the player generates a termination limit of termination units. In any of the previously described embodiments that include a jackpot award, the game is also adapted to end when the player achieves a jackpot award 176. The present invention further includes providing a plurality of stages, wherein the achievement of a predetermined condition or a jackpot award, the survival of a predetermined number of picks or the completion of a predetermined path advances the player to another stage of the game.

After advancing to a different stage, the game provides a new challenge or a new set of chances to the player. In the new stage, the player has an opportunity to advance to a further stage, and so on. In any of the stages, the accumulation or loss of the termination limit of units for any variable ends the game. If the player advances through each stage, the game ends and optionally provides the player a final jackpot.

The multiple stage embodiment includes making the achievement of a jackpot award 176, or alternatively the achievement of the final position along a path 180, the condition to advancing to the next stage. The embodiment includes any number of stages. The jackpot awards 176 do not necessarily have to include an actual credit or multiplier value, i.e., the award can consist of the opportunity for advancement. The multiple stage embodiment is adapted to provide the same procedure or game in each stage or to provide a mix of any of the jackpot embodiments described in FIGS. 11, 12A through 12C and 13.

The multiple stage embodiment is adaptable to increase the jackpot awards 176 as the player advances through the stages. The multiple stage embodiment is also preferably adapted to make advancement in later stages more difficult. The multiple stage embodiment further includes the final jackpot award 176, the award that ends the game, being larger than the preceding jackpots. From the foregoing discussion in connection with the data tables of FIGS. 6A and 6B and FIGS. 7A through 7E, one skilled in the art can create any desired distribution of awards, termination units and survival units in the various stages to achieve any desired award/advancement difficulty distribution.

In a multistage implementation of the masked selector embodiment of FIGS. 15A through 15D, the player picks selectors until accumulating or losing a termination limit of units or until randomly picking the jackpot or advance. If the player picks or achieves the jackpot before accumulating or losing a termination limit of units, the player advances to a new stage. In FIG. 15A, the game begins with twenty variable 1 units, wherein variable 1 decreases from 20 to 0. The game begins with zero variable 2 units, wherein variable 2 increases from 0 to 100. As illustrated in FIG. 15D, the player advances to the next stage because the player randomly generates the jackpot 176 before losing the termination limit of variable 1 units or accumulating the termination limit of variable 2 units.

In a multistage implementation of the masked selector embodiment of FIG. 16, the player picks selectors until accumulating or losing a termination limit of units or until completing a predetermined path. If the player completes the path before accumulating or losing a termination limit of units, the player advances to a new stage. As illustrated, the player advances to the next stage because the player completes the path to the jackpot 176 before losing the termination limit of variable 1 units or accumulating the termination limit of variable 2 units.

In each new stage, the game may also change the number of selectors 100 that the display device 30 or 32 displays and the awards that are assigned to each selector 100 or pick. The game may raise or lower one or more of the termination limits. To make advancing through later stages more difficult, the termination variable, in an embodiment, is lowered so that less termination units are required to terminate the game.

In any of the embodiments disclosed in connection with FIGS. 11, 12A to 12C, 13, 15A to 15D and 16, a simulated or mechanical wheel, reel or other suitable device (not illustrated) may be employed to generate the awards 120. The simulated or mechanical wheel, reel or other device takes the place of the award tables 118 and 122 (FIGS. 6A and 6B) stored in memory. The wheel in a preferred embodiment automatically spins when the player picks a selector 100. A similar wheel, reel or other suitable device may also be employed to generate the jackpot award 176. The spinning devices provide excitement and enjoyment because the player sees the range of possible awards. If the spinning device is simulated, it is in one embodiment incorporated into a display device 30 or 32 with the rest of the game. In another embodiment, the spinning device occupies a separate display area. For the multi-stage embodiment, advancement also can be conditioned on a number of awards being accumulated in the paid display 102 by successive spins of the simulated or mechanical wheel, reel or other device.

Accept/Reject

In each of the embodiments herein disclosed, namely, all embodiments described in connection with FIGS. 3, 4A to 4C, 5A to 5B, 10A to 10E, 11, 12A to 12C, 13, 15A to 15D and 16, the game provides no incentive for the player to stop before one of the termination variables reaches its limit. That is, it is in the player's best interest to continue to accumulate as many awards (perhaps a jackpot award) as possible before hitting a limit. The goal in the embodiments described up until now is to survive for as long as possible and accumulate as many awards as possible.

In a further alternative embodiment of the present invention, each of the embodiments herein disclosed, namely, each of the embodiments described in connection with FIGS. 3, 4A to 4C, 5A to 5C, 6A to 6B, 7A to 7E, 8, 9, 10A to 10E, 11, 12A to 12C, 13, 14, 15A to 15D and 16 may also be adapted to include an accept or reject feature. This feature enables the player at any time to either accept an award that has currently been achieved or reject the award to try for a higher award. Embodiments having the accept or reject feature require an accept input (not illustrated), which is preferably provided as an area of the touch screen 50 connected to the display device 30 or 32. The accept input sends a signal to the processor 38 to provide the player the accumulated award, i.e., the award shown in the paid display 102. Receiving the accept input ends the game. The player's selection of one of the selectors 100 or other path selections illustrated above may also be adapted to provide a reject input. The reject input sends a signal to the processor to reject the accumulated award offer and carry on with the game.

Embodiments having the accept/reject feature provide that if the player's rejection of an offer results in the generation of the termination limit, the player loses any previously accumulated award and may or may not receive a lesser award. In a stand alone game, the game may be adapted to reduce the accumulated award to zero. In a bonus game, the game preferably at least provides a consolation award to the player. Otherwise, the game can merely penalize the player by going back to the previous position or stage, etc. It should be appreciated that in a game employing both the accept/reject feature and a jackpot award, the accept/reject feature can present a dilemma for the player. If the player has amassed a significant award in the paid display but has yet to hit the jackpot and is running low on termination units, the player's smartest move may be to accept the offer and forego the opportunity to win the jackpot award.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one display device;

at least one input device configured to receive an input of a wager;

at least one processor; and at least one memory device which stores a plurality of instructions, which when executed by the at least one processor, cause the at least one processor to operate with the at least one display device and the at least one input device to:

(a) display a path including a plurality of locations;

(b) randomly generate a number of termination units;

(c) display an accumulation of said generated number of termination units;

(d) enable a player to pick one of the locations of the path, wherein if the player picks a first designated location of the path, the number of accumulated termination units is reset and displayed; and (e) provide an award to the player, said award having a value greater than zero and being based, at least in part, on the locations of the path picked by the player.

2. The gaming system of claim 1, wherein if the player picks a second location of the path, when executed by the at least one processor, said plurality of instructions cause the at least one processor to generate and accumulate at least one termination unit.

3. The gaming system of claim 1, wherein when executed by the at least one processor, said plurality of instructions cause the at least one processor to repeat (b) to (d) until the number of accumulated termination units reaches a termination variable.

4. The gaming system of claim 3, wherein when executed by the at least one processor, said plurality of instructions cause the at least one processor to enable an exchange of a quantity of accumulated termination units for an award value.

5. The gaming system of claim 1, wherein said at least one display device and said at least one input device reside in a housing remote from said at least one processor.

6. A gaming system comprising:

at least one display device;

at least one input device configured to receive an input of a wager;

at least one processor; and at least one memory device which stores a plurality of instructions, which when executed by the at least one processor, cause the at least one processor to operate with the at least one display device and the at least one input device to:

(a) display a plurality of selection sets, wherein each selection set includes a plurality of selections and a plurality of said selections are each associated with a number of termination units;

(b) enable a player to pick one of the unpicked selections from one of the selection sets;

(c) display and provide any award and any termination units associated with the picked selection, wherein if any award is associated with the picked selection, said provided award has a value greater than zero;

(d) if a detour is randomly generated:

(i) enable the player to pick one of the selections from another one of the selection sets; and (ii) display and provide any award and any termination units associated with said picked selection, wherein if any award is associated with the picked selection, said provided award has a value greater than zero; and (e) repeat (b) to (d) until the number of provided termination units reaches a termination variable.

7. The gaming system of claim 6, wherein when executed by the at least one processor, said plurality of instructions cause the at least one processor to enable an exchange of a quantity of accumulated termination units for an award value.

8. The gaming system of claim 6, wherein said at least one display device and said at least one input device reside in a housing remote from said at least one processor.

9. A method of operating a gaming system including at least one input device configured to receive an input of a wager, said method comprising:

(a) displaying a path including a plurality of locations;

(b) randomly generating a number of termination units;

(c) displaying an accumulation of the generated number of termination units;

(d) enabling a player to pick one of the locations of the path, wherein if the player picks a first designated location of the path, the number of accumulated termination units is reset and displayed; and (e) providing an award to the player, said provided award having a value greater than zero and being based, at least in part, on the locations of the path picked by the player.

10. The method of claim 9, which includes generating and accumulating at least one termination unit if the player picks a second location of the path.

11. The method of claim 9, which includes repeating (b) to (d) until the number of accumulated termination units reaches a termination variable.

12. The method of claim 11, which includes enabling an exchange of a quantity of accumulated termination units for an award value.

13. The method of claim 9, which is operated via a data network.

14. The method of claim 13, wherein the data network is an internet.

15. A method of operating a gaming system including at least one input device configured to receive an input of a wager, said method comprising:

(a) displaying a plurality of selection sets, wherein each selection set includes a plurality of selections and a plurality of said selections are each associated with a number of termination units;

(b) enabling a player to pick one of the unpicked selections from one of the selection sets;

(c) displaying and providing any award and any termination units associated with the picked selection, wherein if any award is associated with the picked selection, said provided award has a value greater than zero;

(d) if a detour is randomly generated:

(i) enabling the player to pick one of the selections from another one of the selection sets; and (ii) displaying and providing any award and any termination units associated with said picked selection, wherein if any award is associated with the picked selection, said provided award has a value greater than zero; and (e) repeating (b) to (d) until the number of provided termination units reaches a termination variable.

16. The method of claim 15, which includes enabling an exchange of a quantity of accumulated termination units for an award value.

17. The method of claim 15, which is operated via a data network.

18. The method of claim 17, wherein the data network is an internet.

* * * * *